(12) United States Patent
Ohishi et al.

(10) Patent No.: US 12,543,965 B2
(45) Date of Patent: Feb. 10, 2026

(54) BIOLOGICAL INFORMATION MONITORING APPARATUS AND MRI APPARATUS

(71) Applicant: CANON MEDICAL SYSTEMS CORPORATION, Otawara (JP)

(72) Inventors: Takafumi Ohishi, Yokohama (JP); Sadanori Tomiha, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 540 days.

(21) Appl. No.: 17/654,674

(22) Filed: Mar. 14, 2022

(65) Prior Publication Data

US 2022/0301705 A1   Sep. 22, 2022

(30) Foreign Application Priority Data

Mar. 16, 2021   (JP) .................................. 2021-042231

(51) Int. Cl.
*A61B 5/0507*   (2021.01)
*A61B 5/00*   (2006.01)
(Continued)

(52) U.S. Cl.
CPC ........ *A61B 5/0507* (2013.01); *A61B 5/02444* (2013.01); *H01P 5/10* (2013.01);
(Continued)

(58) Field of Classification Search
CPC ..... A61B 5/0507; A61B 5/0205; A61B 5/024; A61B 5/0816; A61B 5/0245;
(Continued)

(56) References Cited

U.S. PATENT DOCUMENTS 4,369,518 A * 1/1983 Olson ....................... H03F 3/60
333/204
4,525,750 A * 6/1985 Hamalainen ............. G11B 5/58
386/311
(Continued)

FOREIGN PATENT DOCUMENTS

CN   101047283 A   10/2007
CN   105514623 A * 4/2016 ............. H01Q 23/00
(Continued)

OTHER PUBLICATIONS

Chen, K. M., Huang, Y., Zhang, J., & Norman, A. (2000). Microwave life-detection systems for searching human subjects under earthquake rubble or behind barrier. IEEE transactions on biomedical engineering, 47(1), 105-114. (Year: 2000).*

(Continued)

*Primary Examiner* — Keith M Raymond
*Assistant Examiner* — Johnathan Maynard
(74) *Attorney, Agent, or Firm* — Oblon, McClelland, Maier & Neustadt, L.L.P.

(57) ABSTRACT

In one embodiment, a biological information monitoring apparatus includes: an antenna assembly including at least one antenna, the antenna assembly being disposed close to an object; a signal generator configured to generate a radio-frequency (RF) signal; and a displacement detection circuit configured to detect a physical displacement of the object based on the RF signal, wherein the at least one antenna includes: a dipole antenna having a feeding point to be supplied with the RF signal, the feeding point being positioned in a center of the dipole antenna; a coaxial line configured to supply the RF signal to the feeding point; and a conductor element that has a ¼ wavelength and is short-circuited on one end to an outer conductor of the coaxial line.

17 Claims, 24 Drawing Sheets

(51) Int. Cl.
*A61B 5/024* (2006.01)
*H01P 5/10* (2006.01)
*H03H 7/42* (2006.01)
*H03H 9/00* (2006.01)
*H03H 11/32* (2006.01)
*A61B 5/0205* (2006.01)
*A61B 5/0245* (2006.01)
*A61B 5/055* (2006.01)
*A61B 5/08* (2006.01)
*A61B 5/113* (2006.01)
*G01R 33/36* (2006.01)
*G01R 33/567* (2006.01)

(52) U.S. Cl.
CPC ............ *H03H 7/42* (2013.01); *H03H 9/0023* (2013.01); *H03H 11/32* (2013.01); *A61B 5/0205* (2013.01); *A61B 5/024* (2013.01); *A61B 5/0245* (2013.01); *A61B 5/055* (2013.01); *A61B 5/0816* (2013.01); *A61B 5/113* (2013.01); *A61B 5/7235* (2013.01); *G01R 33/3685* (2013.01); *G01R 33/567* (2013.01); *G01R 33/5673* (2013.01); *H01L 2924/19051* (2013.01); *H03D 2200/0023* (2013.01)

(58) Field of Classification Search
CPC . A61B 5/02444; A61B 5/1102; A61B 5/1126; A61B 5/05; A61B 5/08; G01R 33/5673; G01R 33/567; H03H 7/42; H01Q 9/27; H01Q 9/065; H01P 5/10
See application file for complete search history.

(56) References Cited

U.S. PATENT DOCUMENTS

| | | | | |
|---|---|---|---|---|
| 4,737,797 | A * | 4/1988 | Siwiak | H01P 5/10 343/859 |
| 5,886,672 | A * | 3/1999 | Brune | H01Q 1/08 343/810 |
| 6,653,910 | B2 * | 11/2003 | Escalera | H01P 5/10 333/25 |
| 8,717,245 | B1 * | 5/2014 | Krivokapic | H01Q 5/378 343/807 |
| 2005/0040991 | A1 * | 2/2005 | Crystal | H01Q 1/36 343/745 |
| 2006/0279383 | A1 * | 12/2006 | Hacker | H01P 5/02 333/263 |
| 2007/0229384 | A1 * | 10/2007 | Yamagajo | H01Q 9/16 343/700 MS |
| 2009/0015502 | A1 * | 1/2009 | Haapala | H01Q 9/16 343/795 |
| 2009/0058751 | A1 * | 3/2009 | Suh | H01Q 1/2266 343/795 |
| 2009/0121964 | A1 * | 5/2009 | Yamada | H01Q 7/00 343/866 |
| 2009/0237177 | A1 * | 9/2009 | Ma | H03D 7/02 333/121 |
| 2010/0182206 | A1 * | 7/2010 | Barbieri | H01Q 21/28 343/893 |
| 2012/0068898 | A1 * | 3/2012 | Clow | H01Q 9/36 343/893 |
| 2013/0057442 | A1 * | 3/2013 | Brown | H01Q 21/24 343/750 |
| 2014/0058254 | A1 | 2/2014 | Yamaji | |
| 2014/0176385 | A1 * | 6/2014 | Apostolos | H01Q 21/24 343/790 |
| 2016/0028141 | A1 * | 1/2016 | Shimizu | H01Q 1/24 29/601 |
| 2017/0033430 | A1 * | 2/2017 | Cromarty | H01Q 1/22 |
| 2017/0317422 | A1 * | 11/2017 | Grando | H01Q 9/285 |
| 2019/0336038 | A1 | 11/2019 | Gorgutsa et al. | |
| 2020/0052406 | A1 * | 2/2020 | Zhinong | H01Q 5/378 |
| 2020/0294658 | A1 | 9/2020 | Ohishi et al. | |
| 2021/0091454 | A1 * | 3/2021 | Plet | H01Q 5/42 |
| 2021/0322697 | A1 * | 10/2021 | Ringkamp | A61B 5/0535 |
| 2023/0168287 | A1 * | 6/2023 | Mitsugi | G01R 21/12 324/629 |

FOREIGN PATENT DOCUMENTS

| | | | | |
|---|---|---|---|---|
| CN | 205583132 U | * | 9/2016 | |
| CN | 111685727 A | | 9/2020 | |
| CN | 112332083 A | * | 2/2021 | ............ H01Q 1/50 |
| CN | 112399822 A | | 2/2021 | |
| EP | 1 742 013 A1 | | 1/2007 | |
| JP | 2009-55997 A | | 3/2009 | |
| JP | 2010-283500 A | | 12/2010 | |
| JP | 4682965 B2 | * | 5/2011 | |
| JP | 2014-116812 A | | 6/2014 | |
| JP | 2015073239 A | * | 4/2015 | |
| JP | 2020-151458 A | | 9/2020 | |
| JP | 2020-178805 A | | 11/2020 | |
| JP | WO2019159315 A1 | * | 1/2021 | ............ A61B 5/113 |
| WO | WO 2020/202531 A1 | | 10/2020 | |

OTHER PUBLICATIONS

Gou, Y., Yang, S., Li, J., & Nie, Z. (2014). A compact dual-polarized printed dipole antenna with high isolation for wideband base station applications. IEEE Transactions on Antennas and Propagation, 62(8), 4392-4395. (Year: 2014).*
Desai, A., & Nayeri, P. (Jan. 2019). A Broadband Printed Conical Bowtie Dipole Antenna with an Integrated Balun. In 2019 United States National Committee of URSI National Radio Science Meeting (USNC-URSI NRSM) (pp. 1-2). IEEE. (Year: 2019).*
Lee, H. (2014). CPW-fed to CPS Dipole Antenna of Microstrip Tapered Balun with Triangular Loop Director. Journal of Electrical Engineering and Technology, 9(4), 1365-1368. (Year: 2014).*
He, R., Zhang, H., See, C. H., Su, Y., Ma, Y., Kong, D., . . . & Abd-Alhameed, R. (2018). A 1×8 Linear Ultra-Wideband Phased Array With Connected Dipoles and Hyperbolic Microstrip Baluns. IEEE Access, 6, 52953-52968. (Year: 2018).*
Li, R., Wu, T., Pan, B., Lim, K., Laskar, J., & Tentzeris, M. M. (2009). Equivalent-circuit analysis of a broadband printed dipole with adjusted integrated balun and an array for base station applications. IEEE Transactions on Antennas and Propagation, 57(7), 2180-2184. (Year: 2009).*
Antenna Theory. (2020). Baluns. Retrieved Feb. 2020 from https://web.archive.org/web/20200201115123/http://www.antenna-theory.com/definitions/balun.php (Year: 2020).*
Antenna Theory. (2020). Bazooka Balun. Retrieved Feb. 2020 from https://web.archive.org/web/20200201115105/http://www.antenna-theory.com/definitions/bazooka.php (Year: 2020).*
Antenna Theory. (2020). Folded Baluns. Retrieved Feb. 2020 from https://web.archive.org/web/20200201115122/http://www.antenna-theory.com/definitions/foldedbalun.php (Year: 2020).*
Antenna Theory. (2020). Tapered Baluns. Retrieved Feb. 2020 from https://web.archive.org/web/20200201115115/http://www.antenna-theory.com/definitions/taperedbalun.php (Year: 2020).*
Antenna Theory. (2020). The Infinite Balun. Retrieved Feb. 2020 from https://web.archive.org/web/20200215173047/http://www.antenna-theory.com/definitions/infinite.php (Year: 2020).*
Huang, C. H., Chen, C. H., & Horng, T. S. (Jan. 2010). Design of Marchand balun of spiral shape using physical transformer model on silicon integrated passive device substrate. In 2010 IEEE Radio and Wireless Symposium (RWS) (pp. 456-459). IEEE. (Year: 2010).*
Wang, J., Zhang, W., & Yu, Z. (Apr. 2007). The Design of a Planar-Spiral Transformers Balun Used in RF/MW Based on 0.13 µm CMOS Process. In 2007 International Conference on Microwave and Millimeter Wave Technology (pp. 1-4). IEEE. (Year: 2007).*
Suh, B., Kim, Y., Kim, T., & Jeon, S. (2013). K-and Ka-band miniature CMOS balun with a single spiral coupled structure. Journal of Electromagnetic Waves and Applications, 27(15), 1910-1918. (Year: 2013).*

(56) References Cited

OTHER PUBLICATIONS

Li, Y., Zhu, X. W., Tian, L., & Liu, R. J. (2020). Compact 2-18 GHz on-chip balun based on centrosymmetric spiral transformers. Electronics Letters, 56(5), 229-230. (Year: 2020).*

Kim, S., Tentzeris, M. M., Jin, G., & Nikolaou, S. (Jul. 2012). Inkjet printed ultra wideband spiral antenna using integrated balun on liquid crystal polymer (LCP). In Proceedings of the 2012 IEEE International Symposium on Antennas and Propagation (pp. 1-2). IEEE. (Year: 2012).*

Microwaves 101. (2020). Planar RF Baluns. Retrieved Oct. 2020 from https://web.archive.org/web/20201029201630/https://www.microwaves101.com/encyclopedias/planar-rf-baluns (Year: 2020).*

Extended European Search Report issued Aug. 16, 2022 in European Patent Application No. 22162480.2. 11 pages.

Anonymous: "Dipole antenna—Wikipedia", Retrieved from the Internet: URL:https://en.wikipedia.org/w/index.php?title=Dipole_antenna&oldid=1011387137, Mar. 10, 2021 (Mar. 10, 2021), pp. 8-11, XP055948695, 4 total pages.

Boskamp, E., et al., "Dipole position sensors integrated in receiver array for motion detection and correction", Proceedings of the 2021 ISMRM & SMRT Annual Meeting & Exibition, May 15-20, 2021, ISMRM, 2030 Addison Street, 7$^{th}$ Floor, Berkeley, CA, 94704 USA, No. 4038, Apr. 30, 2021 (Apr. 30, 2021). XP040726055, 6 pages.

European Office Action issued Jul. 3, 2024 in European Patent Application No. 22 162 480.2, 8 pages.

Japanese Office Action issued Aug. 20, 2024 in Japanese Patent Application No. 2021-042231, 3 pages.

Yong-Jun et al., "Sensitivity Enhanced Vital Sign Detection Based on Antenna Reflection Coefficient Variation", IEEE Transactions on Biomedical Circuits and Systems, vol. 10, No. 2, Apr. 2016, pp. 319-327, XP 011601092.

Li et al, "Equivalent-Circuit Analysis of a Broadband Printed Dipole with Adjusted Integrated Balun and an Array for Base Station Applications", IEEE Transactions on Antennas and Propagation, vol. 57, No. 7, Jul. 2009, pp. 2180-2184.

"Sleeve Balun", Tuks.nl, Retrieved from the Internet [URL: http://www.tuks.nl/img/sleeve.html], Retrieved on Dec. 26, 2011, 3 pages.

Chinese Office Action issued Mar. 18, 2025 in Chinese Patent Application No. 202210258600.2, 10 pages.

\* cited by examiner

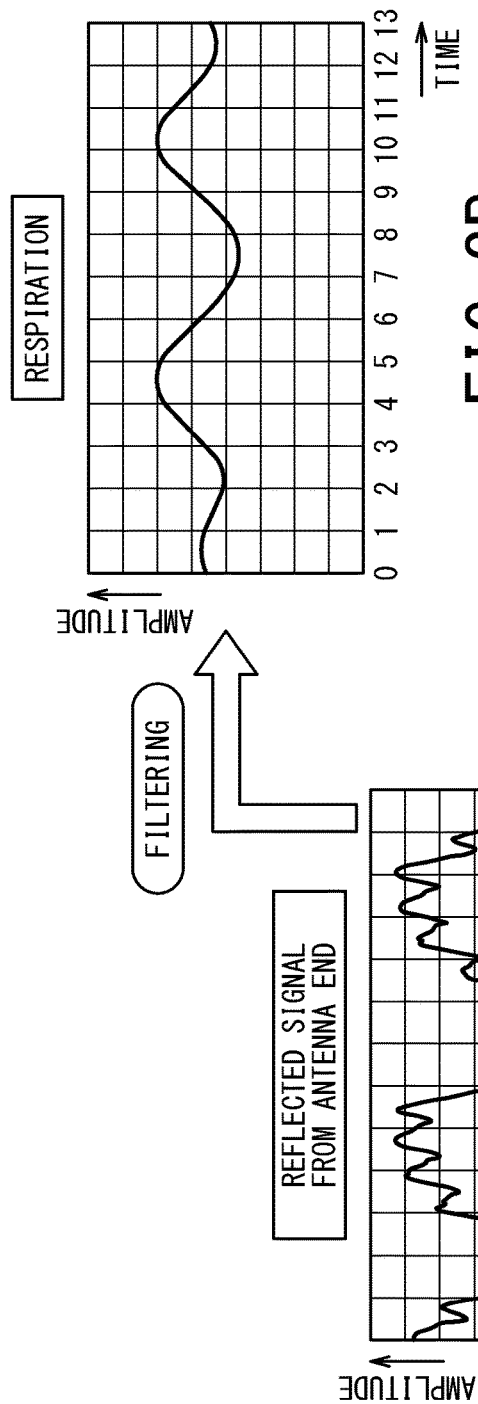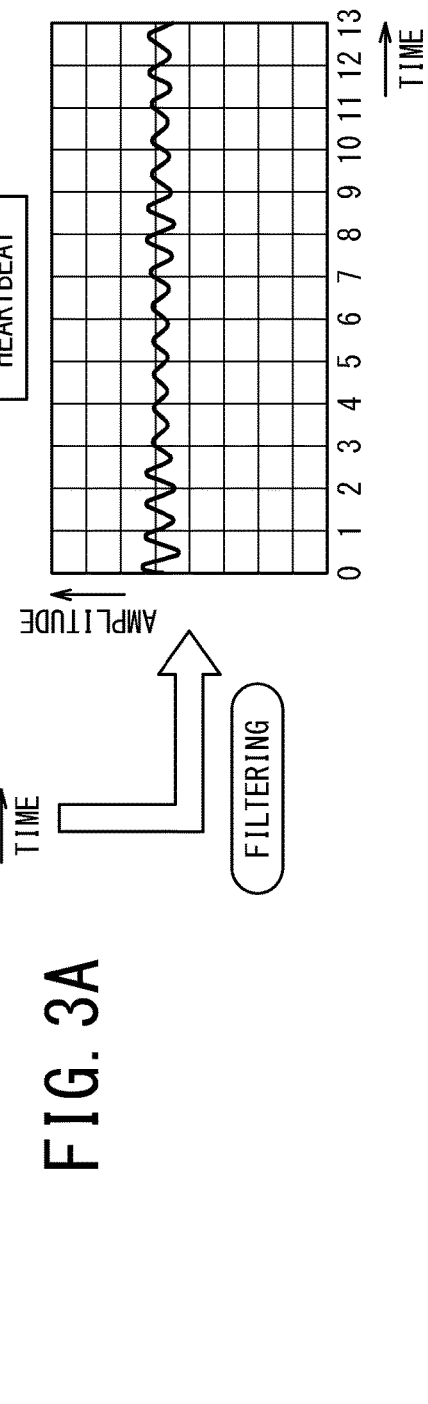

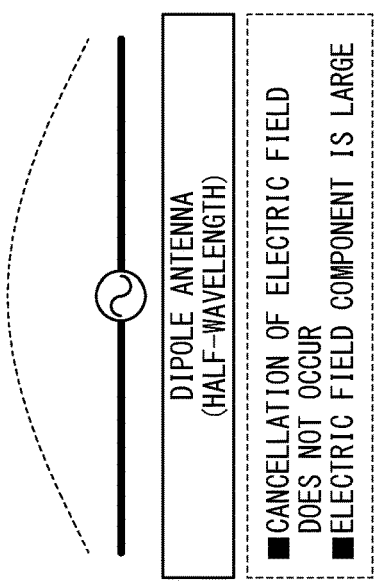

LOOP ANTENNA
(ONE WAVELENGTH)

- ELECTRIC FIELD IS NOT CANCELED BECAUSE CURRENT DISTRIBUTION ON OPPOSITE SIDE HAS OPPOSITE PHASE
- IN NEAR FIELD, ELECTRIC FIELD COMPONENT IS LARGER THAN MAGNETIC FIELD COMPONENT
- ANTENNA SIZE: LARGE

FIG. 4A

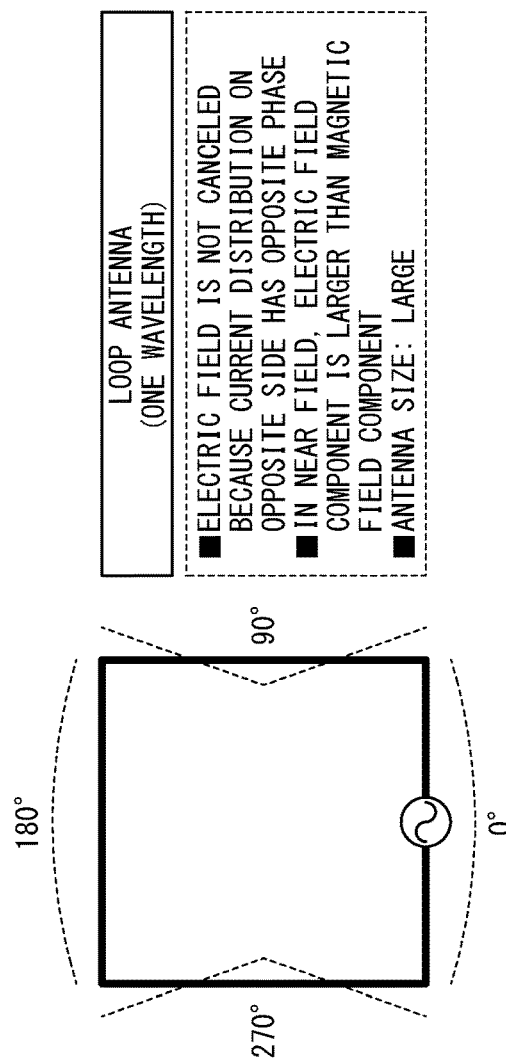

LOOP ANTENNA
(SHORTER THAN RESONANCE LENGTH)

- ELECTRIC FIELD CANCELLATION OCCURS BECAUSE CURRENT DISTRIBUTION ON OPPOSITE SIDE DOES NOT BECOME OPPOSITE PHASE
- IN NEAR FIELD, MAGNETIC FIELD COMPONENT IS LARGER THAN ELECTRIC FIELD COMPONENT

⇨ MAGNETIC FIELD COUPLING WITH HUMAN BODY

FIG. 4B

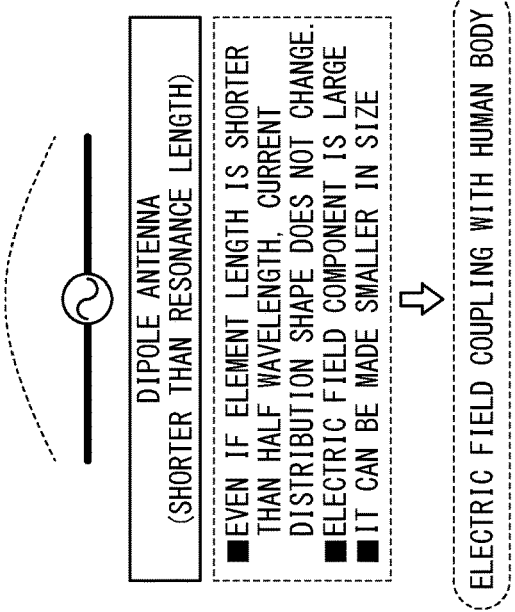

DIPOLE ANTENNA
(HALF-WAVELENGTH)

- CANCELLATION OF ELECTRIC FIELD DOES NOT OCCUR
- ELECTRIC FIELD COMPONENT IS LARGE

FIG. 4C

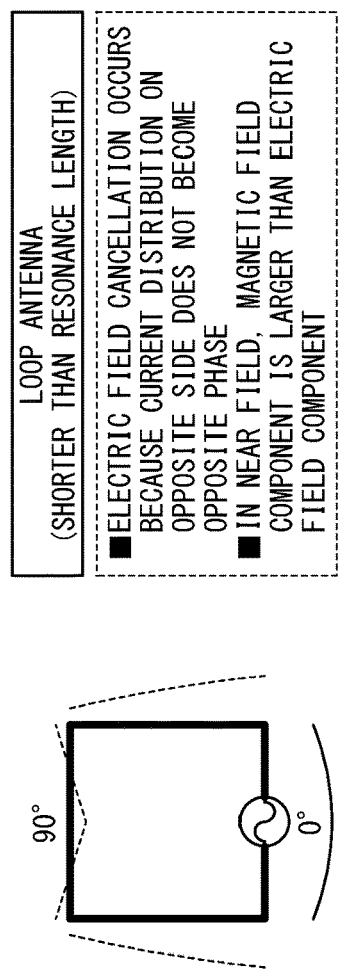

DIPOLE ANTENNA
(SHORTER THAN RESONANCE LENGTH)

- EVEN IF ELEMENT LENGTH IS SHORTER THAN HALF WAVELENGTH, CURRENT DISTRIBUTION SHAPE DOES NOT CHANGE
- ELECTRIC FIELD COMPONENT IS LARGE
- IT CAN BE MADE SMALLER IN SIZE

⇨ ELECTRIC FIELD COUPLING WITH HUMAN BODY

FIG. 4D

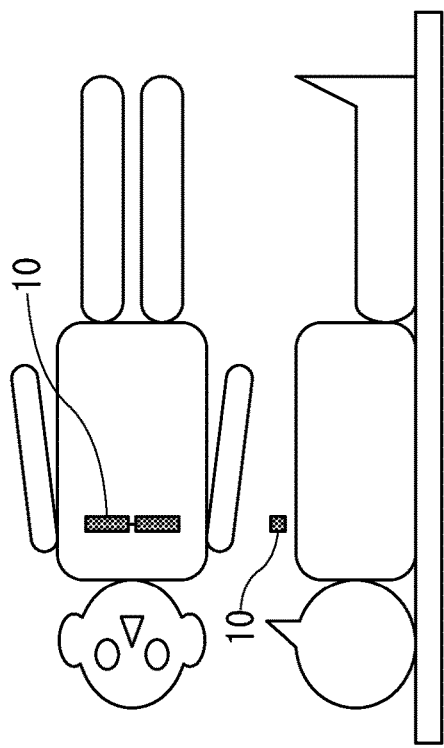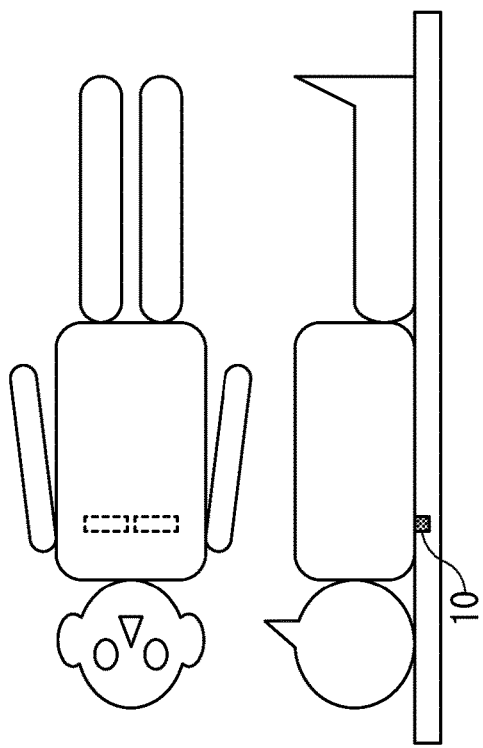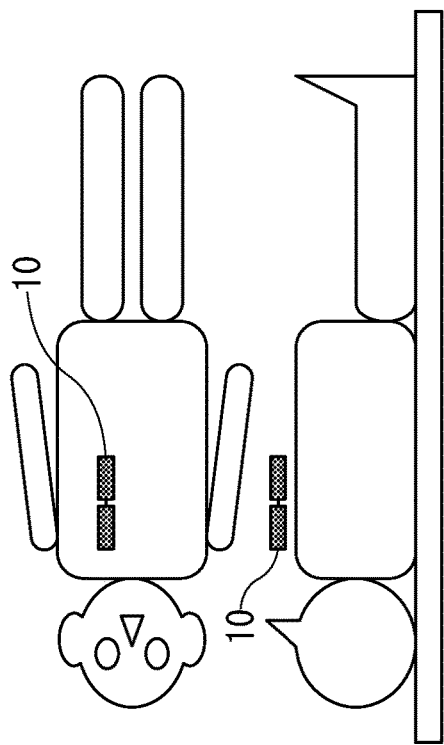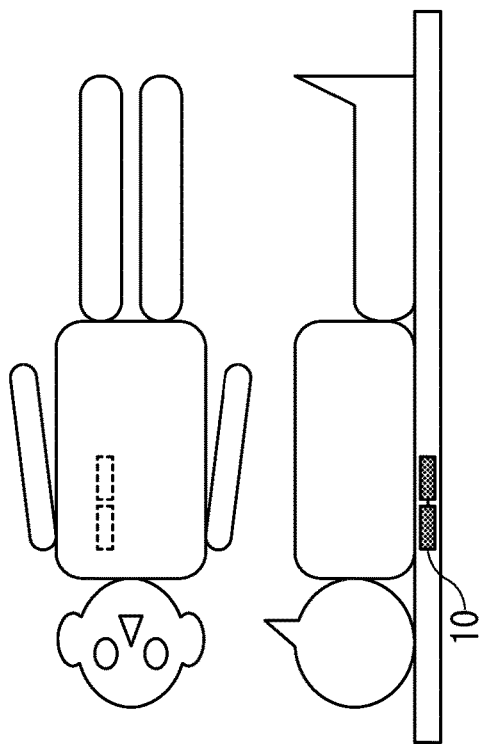
FIG. 5A
FIG. 5B
FIG. 5C
FIG. 5D

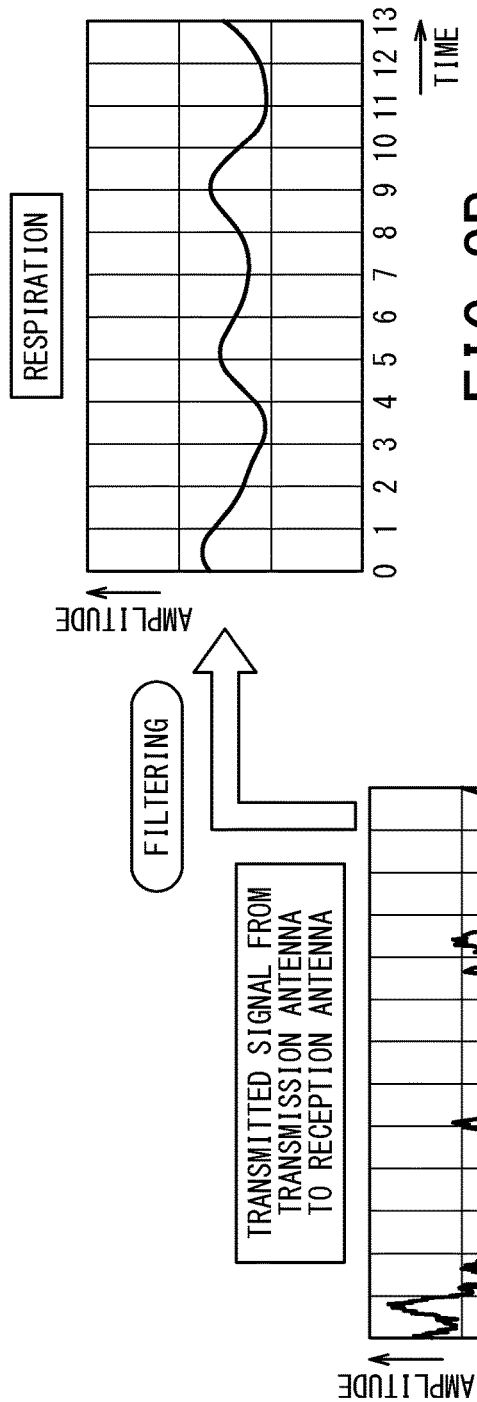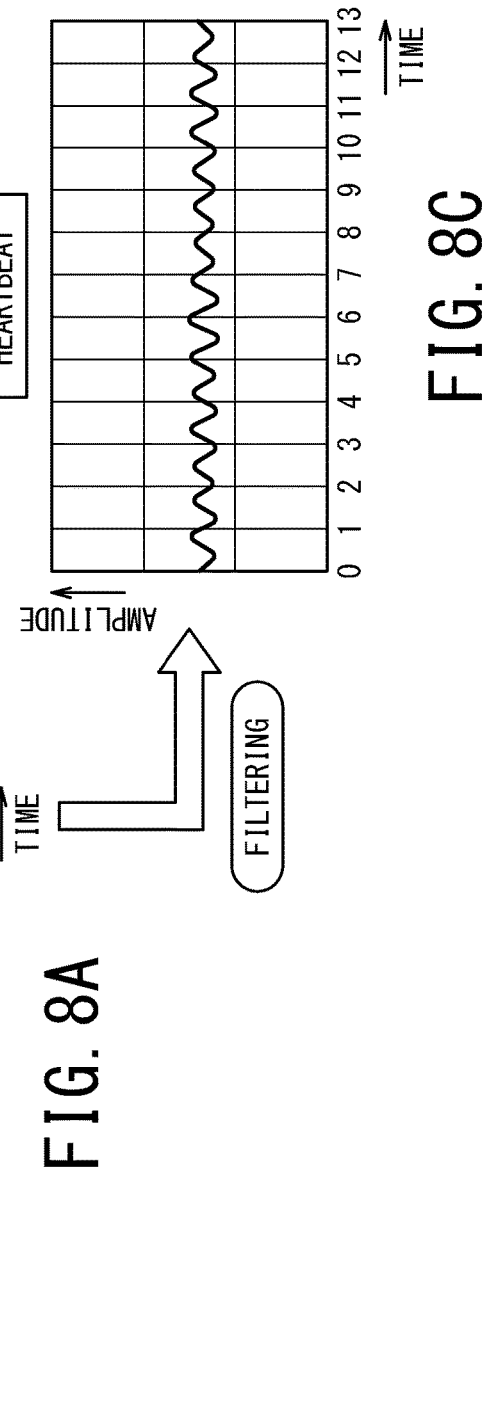

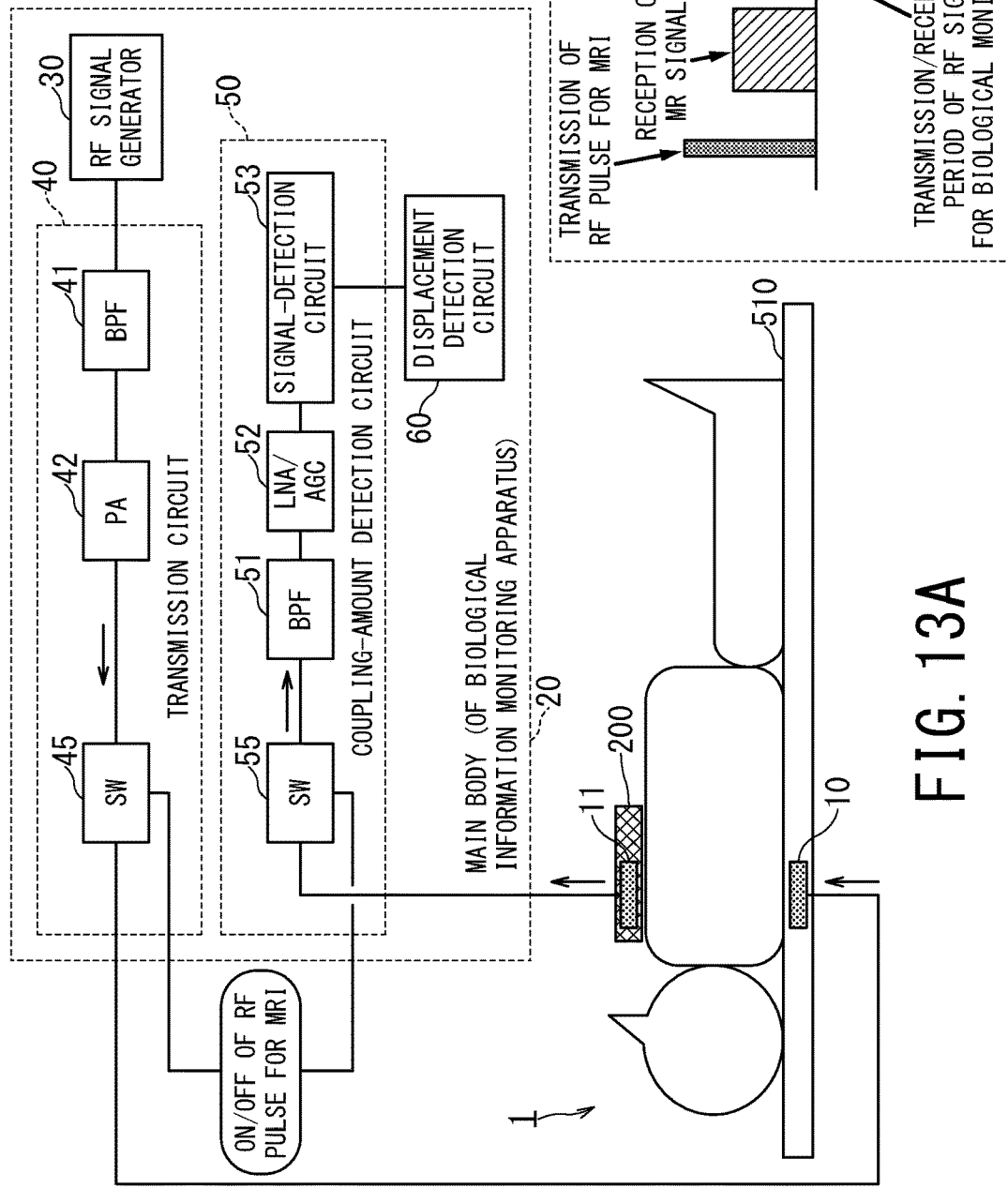

BIOLOGICAL INFORMATION MONITORING APPARATUS AND MRI APPARATUS

CROSS-REFERENCE TO RELATED APPLICATION

This application is based upon and claims the benefit of priority from Japanese Patent Application No. 2021-042231, filed on Mar. 16, 2021, the entire contents of which are incorporated herein by reference.

TECHNICAL FIELD

Disclosed Embodiments relate to a biological information monitoring apparatus and a magnetic resonance imaging (MRI) apparatus.

BACKGROUND

In imaging using an MRI apparatus, data (e.g., Magnetic Resonance (MR) signals) acquired from an object may fluctuate due to body motion such as heartbeat and respiration of a human body. Conventionally, in order to correct influence of heartbeat on the MR imaging, electrodes of an electrocardiograph, for example, are attached to the human body such that imaging timing is adjusted by using signals outputted from the electrocardiograph and/or the acquired data are corrected on the basis of the signals from the electrocardiograph. However, attaching the electrodes to the human body is a burden on the patient and also causes decrease in work efficiency for a medical imaging technologist.

In another known imaging method, data for monitoring a body motion caused by respiration or breathing are additionally acquired as navigation data aside from data acquisition for generating diagnostic images so that the navigation data can be used for correcting the influence of a body motion caused by respiration. However, in this method, extra time is required for acquiring the navigation data, and thus its imaging time becomes longer. From such a viewpoint, there is a demand for a non-contact type body-motion monitoring apparatus that does not impose a burden on the patient.

The non-contact type body-motion monitoring apparatus has been widely demanded not only in imaging using an MRI apparatus but also in the field of health care. There is also a demand for a body-motion monitoring apparatus that can monitor, for example, a cardiac rate and a respiration rate during sleep and/or during driving of a vehicle in a contactless manner without imposing a burden on the human body.

In a conventionally proposed apparatus, a motion of the object is detected by using a radio wave for detecting a heart rate and/or a respiration rate. In this apparatus, a radio wave is transmitted from an antenna to the object, and then, by detecting change in a reflected radio wave from the object, a motion of the object is detected.

However, in the conventional detection apparatus using a radio wave, not only reflected waves from the object but also reflected waves from various structures around the object are simultaneously received, which causes a fading phenomenon and makes it difficult to reliably and stably detect the heartbeat and respiration of the object.

BRIEF DESCRIPTION OF THE DRAWINGS

In the accompanying drawings:

FIG. 3A is a graph for illustrating actual measured values of a reflected signal from an antenna;

FIG. 3B is a graph for illustrating a waveform of respiration extracted from the reflected signal;

FIG. 3C is a graph for illustrating a waveform of heartbeat extracted from the reflected signal;

FIG. 4A to FIG. 4D are schematic diagrams for illustrating comparison between a loop antenna and a dipole antenna applied as the antenna in the biological information monitoring apparatus;

FIG. 5A to FIG. 5D are schematic diagrams for illustrating disposition of the antenna to be used in the first embodiment;

FIG. 8A is a graph for illustrating actual measured values of a transmitted signal from the transmission antenna to the reception antenna;

FIG. 8B is a graph for illustrating a waveform of respiration extracted from the transmitted signal;

FIG. 8C is a graph for illustrating a waveform of heartbeat extracted from the transmitted signal;

FIG. 13A is a block diagram illustrating a configuration of the biological information monitoring apparatus to be used in the MRI apparatus;

FIG. 13B is a schematic diagram illustrating a transmission/reception period of a high-frequency signal for a biological monitor;

DETAILED DESCRIPTION

In one embodiment, a biological information monitoring apparatus includes: an antenna assembly including at least one antenna, the antenna assembly being disposed close to an object; a signal generator configured to generate a radio-frequency (RF) signal; and a displacement detection circuit configured to detect a physical displacement of the object based on the RF signal. The at least one antenna includes: a dipole antenna having a feeding point to be supplied with the RF signal, the feeding point being positioned in a center of the dipole antenna; a coaxial line configured to supply the RF signal to the feeding point; and a conductor element that has a ¼ wavelength and is short-circuited on one end to an outer conductor of the coaxial line.

First Embodiment

Hereinbelow, the first embodiment of the present invention will be described by referring to the accompanying drawings.

Figure 1:
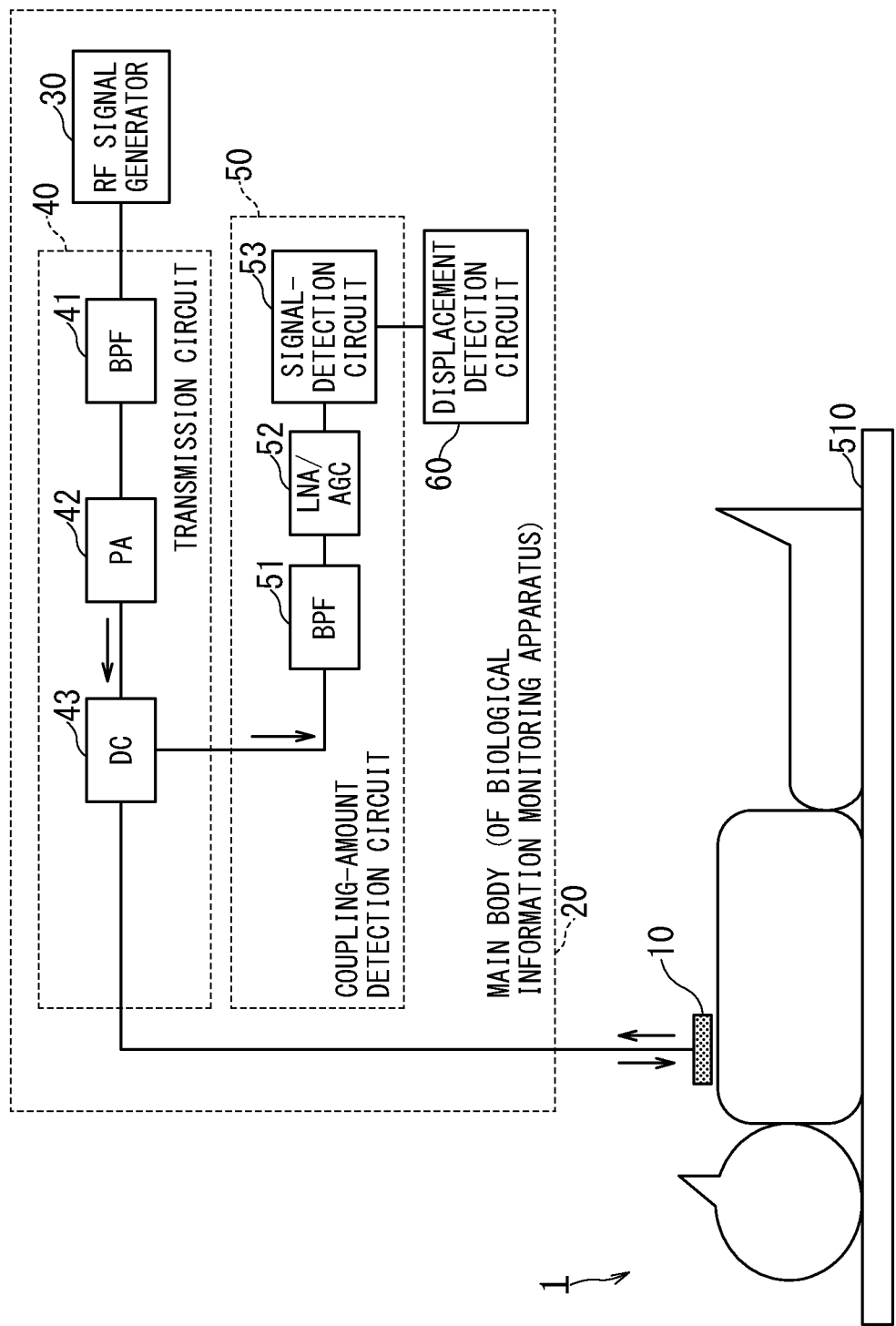
FIG. 1 is a configuration diagram illustrating an overall configuration of a biological information monitoring apparatus according to the first embodiment.

FIG. 1 is a block diagram illustrating an overall configuration of a biological information monitoring apparatus 1 according to the first embodiment. The biological information monitoring apparatus 1 includes an antenna 10 and a biological-information monitoring main-body 20 (hereinafter, shortly referred to as the main body 20). The antenna 10 is a configuration of an antenna assembly. Since the biological information monitoring apparatus 1 basically includes one antenna in the first embodiment, the antenna assembly is configured as one antenna. In other embodiments described below, the biological information monitoring apparatus 1 may have a plurality of antennas. In such a case, the antenna assembly includes a plurality of antennas.

The antenna 10 is disposed close to an object, which may be usually a human body or a patient. The antenna 10 does not need to be directly adhered to the skin of the object like electrodes of an electrocardiograph, and may be placed on the clothes of the object, for example. Although FIG. 1 illustrates a case where the antenna 10 is disposed on the chest of the object lying on a table 510 of a bed, the posture of the object and/or the part of the object on which the antenna 10 is disposed are not limited to the situation as shown in FIG. 1. For example, the antenna 10 may be disposed on the chest or back of the object in a standing position or may be disposed on the chest or back of the object in a sitting position, for example, during driving of a vehicle.

The main body 20 includes an RF (radio frequency) signal generator 30, a transmission circuit 40, a coupling-amount detection circuit 50, and a displacement detection circuit 60.

The RF signal generator (or signal generator, simply) 30 generates a high-frequency signal as a continuous wave. Although the frequency of the high-frequency signal is not limited to a specific frequency, a frequency in the VHF band (from 30 MHz to 300 MHz) or in the UHF band (from 300 MHz to 3 GHz) may be selected in accordance with the dimensions of the antenna, for example. The high-frequency signal may be referred to as a radio-frequency signal.

The transmission circuit 40 causes the high-frequency signal to pass through a band-pass filter (BPF) 41, then amplifies the high-frequency signal to a predetermined power by a power amplifier (PA) 42, and then outputs it to the antenna 10 via a directional coupler (DC) 43.

The coupling-amount detection circuit 50 has the function of detecting the amount of near-field coupling caused by the electric field between the object and the antenna 10. For implementing this function, the coupling-amount detection circuit 50 includes a band-pass filter (BPF) 51, a low-noise amplifier (LNA/AGC) 52 with an automatic gain adjustment function, and a signal-detection circuit 53, for example.

The RF signal generator 30, the transmission circuit 40, and the coupling-amount detection circuit 50 can be mounted on, for example, a printed substrate housed in one casing.

Although the high-frequency signal outputted from the directional coupler 43 of the transmission circuit 40 is inputted to the antenna 10, part of this high-frequency signal does not enter the object but is bounced off (reflected) at the input end of the antenna 10, returned to the directional coupler 43, and then is branched and inputted to the coupling-amount detection circuit 50.

The coupling-amount detection circuit 50 detects the signal outputted from the branch end of the directional coupler 43 by using the signal-detection circuit 53 so as to measure magnitude of the reflected signal from the antenna 10. Then, the coupling-amount detection circuit 50 detects the amount of near-field coupling on the basis of the measured magnitude of the reflected signal.

Considering that the power outputted from the transmission circuit 40 to the antenna 10 is a constant value, the coupling-amount detection circuit 50 equivalently detects the S11 parameter indicating the reflection loss (i.e., return loss) of the antenna 10.

Figure 2B:
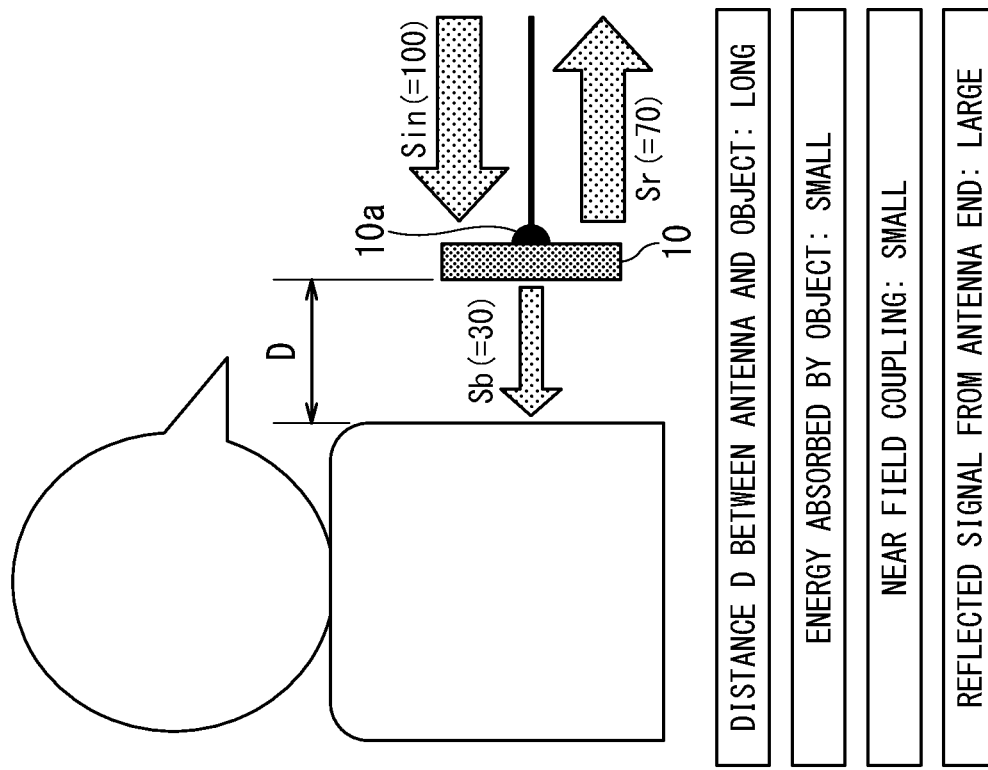
FIG. 2A and FIG. 2B are schematic diagrams illustrating the operation concept of the biological information monitoring apparatus according to the first embodiment.
Figure 2A:
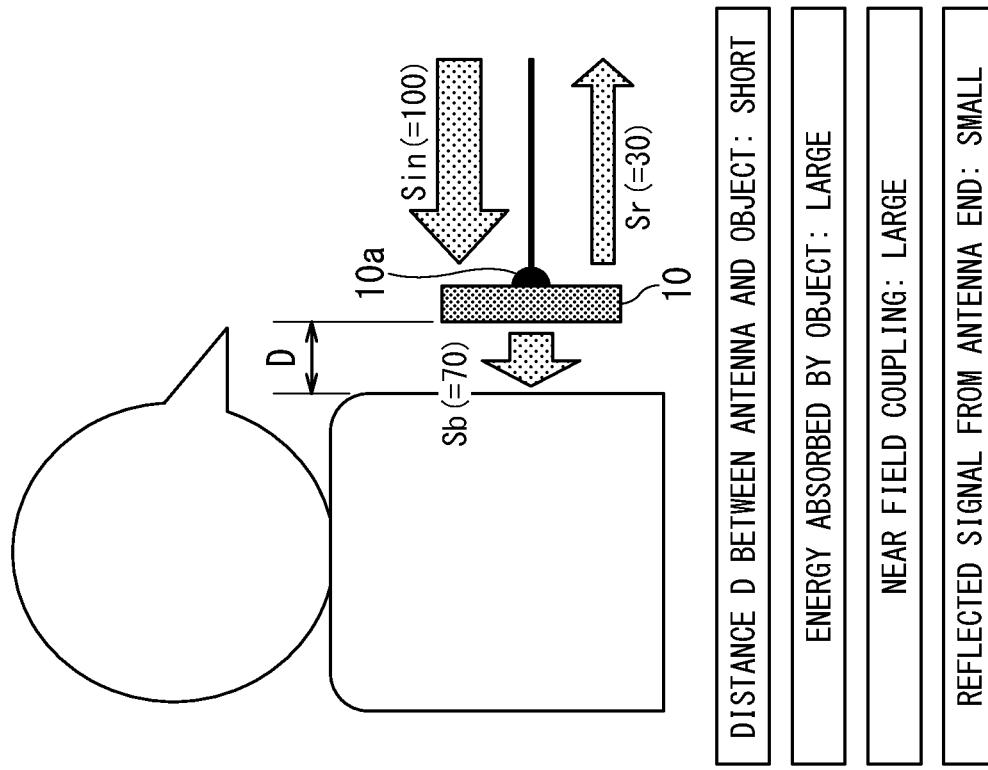

FIG. 2A and FIG. 2B are schematic diagrams illustrating the operation concept of the biological information monitoring apparatus 1 according to the first embodiment. FIG. 2A schematically illustrates the operation when the distance D between the object and the antenna 10 is short, while FIG. 2B schematically illustrates the operation when the distance D between the object and the antenna 10 is long. Note that the object (human body) has electrical conductivity, and thus readily absorbs energy from the antenna 10 when the antenna 10 approaches the object.

Hence, as shown in FIG. 2A, when the distance D between the object and the antenna 10 is short, the energy absorbed by the object increases. This means that the amount of near-field coupling between the object and antenna 10 is large. The power Sin inputted to the antenna 10 is mainly divided into power Sb absorbed by the object and power Sr reflected from the antenna end 10a of the antenna 10. When the distance D is short, the power Sb absorbed by the object increases, while the power Sr reflected from the antenna end 10a decreases accordingly. For example, when the power Sin inputted to the antenna 10 is assumed to be 100, the power Sb absorbed by the object may become 70, and the power Sr reflected from the antenna end 10a may become 30.

This means that the reflected signal from the antenna end 10a decreases and the reflection loss (i.e., return loss) of the antenna 10 also decreases when the distance D between the object and the antenna 10 is short. In other words, the S11 parameter, which is an index of the mismatch degree of antenna 10, indicates a small value. The S11 parameter is an index represented by the square root of the ratio of the reflected power to the input power inputted to the antenna 10.

On the other hand, as shown in FIG. 2B, when the distance D between the object and the antenna 10 is long, the energy to be absorbed by the object decreases. This means that the amount of near-field coupling between the object and antenna 10 is small. As a result, when the distance D is long, the power Sb absorbed by the object decreases, and thus, the power Sr reflected from the antenna end 10a increases, accordingly. For example, when the power Sin inputted to the antenna 10 is assumed to be 100, the power Sb absorbed by the object may become 30, and the power Sr reflected from the antenna end 10a may become 70.

This means that the reflected signal from the antenna end 10a increases and the reflection loss (i.e., return loss) of the antenna 10 also increases when the distance D between the object and the antenna 10 is long. In other words, the S11 parameter, which is an index of the mismatch degree of antenna 10, indicates a large value.

As described above, when the input power to the antenna 10 is assumed to be constant, the reflected signal from the antenna end 10a changes depending on the distance D between the object and the antenna 10. In other words, the mismatch degree of the antenna 10 or the value of the S11 parameter also changes depending on the distance D between the object and the antenna 10. Since the distance D between the object and the antenna 10 changes depending on the body motion such as heartbeat and/or respiration, magnitude of the reflected signal from the antenna end 10a or the value of the S11 parameter changes depending on changes in body motion such as heartbeat and/or respiration.

The biological information monitoring apparatus 1 of the first embodiment is configured to use above-described characteristics, and detects the magnitude of the reflected signal from the antenna 10 disposed near the object or the value of the S11 parameter so as to detect the body motion such as heartbeat and/or respiration.

FIG. 3A is a graph for illustrating actual measured values of the reflected signal from the antenna 10. In this graph, the horizontal axis indicates time and the vertical axis indicates amplitude of the reflected signal. As shown in FIG. 3A, the reflected signal from the antenna 10 has a waveform in which a short-period fluctuation waveform corresponding to heartbeat is superimposed on a relatively long-period fluctuation waveform corresponding to respiration. The reflected signal from the antenna 10 is detected by the signal-detection circuit 53 of the coupling-amount detection circuit 50, and then is outputted to the displacement detection circuit 60.

The displacement detection circuit 60 may be configured as, for example, a dedicated printed circuit board provided with a processor or may be configured as an information processing apparatus such as a personal computer or a tablet terminal device provided with a display.

The displacement detection circuit 60 performs filtering processing on the reflected signal detected by the signal-detection circuit 53 for extracting a frequency component corresponding to a respiratory motion and another frequency component corresponding to heartbeat so as to generate a respiratory waveform shown in FIG. 3B and a heartbeat waveform shown in FIG. 3C. Additionally or alternatively, the displacement detection circuit 60 may perform Fourier transform on the reflected signal from the antenna 10, then extract the respective frequency components corresponding to the respiratory motion and heartbeat, and then perform inverse Fourier transform on both extracted frequency components so as to generate the respiratory waveform shown in FIG. 3B and the heartbeat waveform shown in FIG. 3C.

The displacement detection circuit 60 may enable an appropriate display to display the generated respiratory waveform and heartbeat waveform, or may analyze the generated respiratory waveform and heartbeat waveform. For example, the displacement detection circuit 60 may analyze the respiratory waveform and/or the heartbeat waveform so as to acquire respiratory and/or cardiac parameters such as a respiratory rate, a respiratory cycle, a cardiac rate, and/or a cardiac cycle. Further, the displacement detection circuit 60 may detect presence/absence of an abnormality in respiration or heartbeat from the acquired respiratory and/or cardiac parameters.

FIG. 4A to FIG. 4D are schematic diagrams for illustrating comparison between a loop antenna and a dipole antenna applied as the antenna 10 in the biological information monitoring apparatus 1.

FIG. 4A shows a loop antenna having a loop length equivalent to a resonance length, i.e., a one-wavelength loop antenna. In the one-wavelength loop antenna, the electric field is not canceled since the current distribution on the opposite side has an opposite phase. Thus, in the near field, the electric field component becomes larger than the magnetic field component. Although it depends on the frequency to be used, the one-wavelength loop antenna is relatively large in antenna size.

FIG. 4B shows a loop antenna having a loop length shorter than the resonance length. In this type of loop antenna, cancellation of the electric field occurs because the current distribution on the opposite side does not become the opposite phase. Thus, in the near field, the magnetic field component becomes larger than the electric field component. Hence, it is magnetic field coupling that couples with the human body in the near field. Magnetic field coupling tends to readily pass through the inside of the human body.

FIG. 4C shows a half-wave dipole antenna. In the half-wavelength dipole antenna, there is no cancellation of the electric field, so the electric field component is large in the near field.

FIG. 4D shows a dipole antenna having an element length shorter than the resonance length. Even the element length is shorter than the resonance length (i.e., half wavelength), the current distribution shape does not change. Thus, in the case of this dipole antenna shown in FIG. 4D, the electric field component is large in the near field similarly to the half-wave dipole antenna. The dipole antenna shown in FIG. 4D can be made smaller in size than the half-wave dipole antenna. In the case of this dipole antenna, the electric field component is large in the near field, so it is electric field coupling that couples with the human body in the near field. Electric field coupling tends to readily propagate on the surface of the body.

From the viewpoint of miniaturization, it is preferred to use a loop antenna having a loop length shorter than the resonance length (FIG. 4B) and/or a dipole antenna having an element length shorter than a half wavelength (FIG. 4D), and either one of both antennas can be used for the biological information monitoring apparatus 1. However, it is acknowledged that the dipole antenna tends to extract a more detailed electrocardiographic waveform than the loop antenna.

Regarding a usual antenna used for communication, it is required to reduce the reflected signal from the antenna as much as possible so as to increase the power into space as much as possible. Thus, the voltage standing wave ratio (VSWR) of the antenna is preferably to be as close to 1.0 as possible. By contrast, in the biological information monitoring apparatus 1 of the first embodiment, heartbeat and a respiratory motion are detected by detecting the reflected signal from the antenna 10. For this reason, having a certain degree of reflected signal from the antenna 10 is actually preferable. Hence, the voltage standing wave ratio (VSWR) of the antenna 10 used in the biological information monitoring apparatus 1 of the first embodiment is preferably set to, for example, a value between 2.0 and 5.0.

FIG. 5A to FIG. 5D are schematic diagrams for illustrating disposition of the antenna 10 used in the first embodiment. Although the number of the antenna 10 of the first embodiment is basically one, many variations of disposition and orientation of the antenna 10 are conceivable. As a basic idea, it is preferred to dispose the antenna 10 at a position where the body motion is more apparent to tell. In the case of detecting heartbeat, it is preferred to dispose the antenna 10 at a position as close to the heart as possible.

Each of FIG. 5A to FIG. 5D illustrates a dipole antenna as the antenna 10. It is said that the heart's motion is greater in the head-foot direction than in the right-left direction of the object. For this reason, in FIG. 5A, the antenna 10 is disposed in a longitudinal direction that matches the head-foot direction of the object, and near the heart on the anterior side in the anterior-posterior direction of the object. In FIG. 5B, the antenna 10 is disposed near the heart on the back side (i.e., posterior side) of the object, while the longitudinal direction of the dipole antenna matches the head-foot direction of the object as well.

The position of the antenna 10 may be subject to some physical restrictions. For example, when the cardiac rate of the object is measured by using the biological information monitoring apparatus 1 during imaging of the object using an MRI apparatus 100, an RF coil (i.e., local coil or surface coil) 200 of the MRI apparatus 100 is disposed on the object. When the RF coil 200 is a chest coil, for example, the antenna 10 is disposed at a position avoiding the chest coil and as close to the heart as possible, as shown in FIG. 5C. When the antenna 10 is disposed on the back side and the RF coil 200 is a spine coil, for example, the antenna 10 is disposed at a position avoiding the spine coil and as close to the heart as possible, as shown in FIG. 5D.

As described above, in the biological information monitoring apparatus 1 according to the first embodiment, a body motion such as heartbeat and/or respiration is detected as change in coupling amount of the near-field coupling between the antenna 10 and the human body. This change in coupling amount of the near-field coupling is measured as change in the reflected signal reflected from the input end of the antenna 10 or as change in the value of the S11 parameter, which is the reflection loss of the antenna 10. The "input end" of the antenna 10 may be referred to as an "input terminal" of the antenna 10. Thus, while the detection method of the biological information monitoring apparatus 1 according to the first embodiment is a non-contact detection method using radio waves, the biological information monitoring apparatus 1 is less susceptible to fading due to the reflected waves from structures around the object, for example, a gantry of an MRI apparatus or various devices in an examination room. Thus, the biological information monitoring apparatus 1 can detect heartbeat and/or a respiratory motion with high reliability.

Second Embodiment

Figure 6:
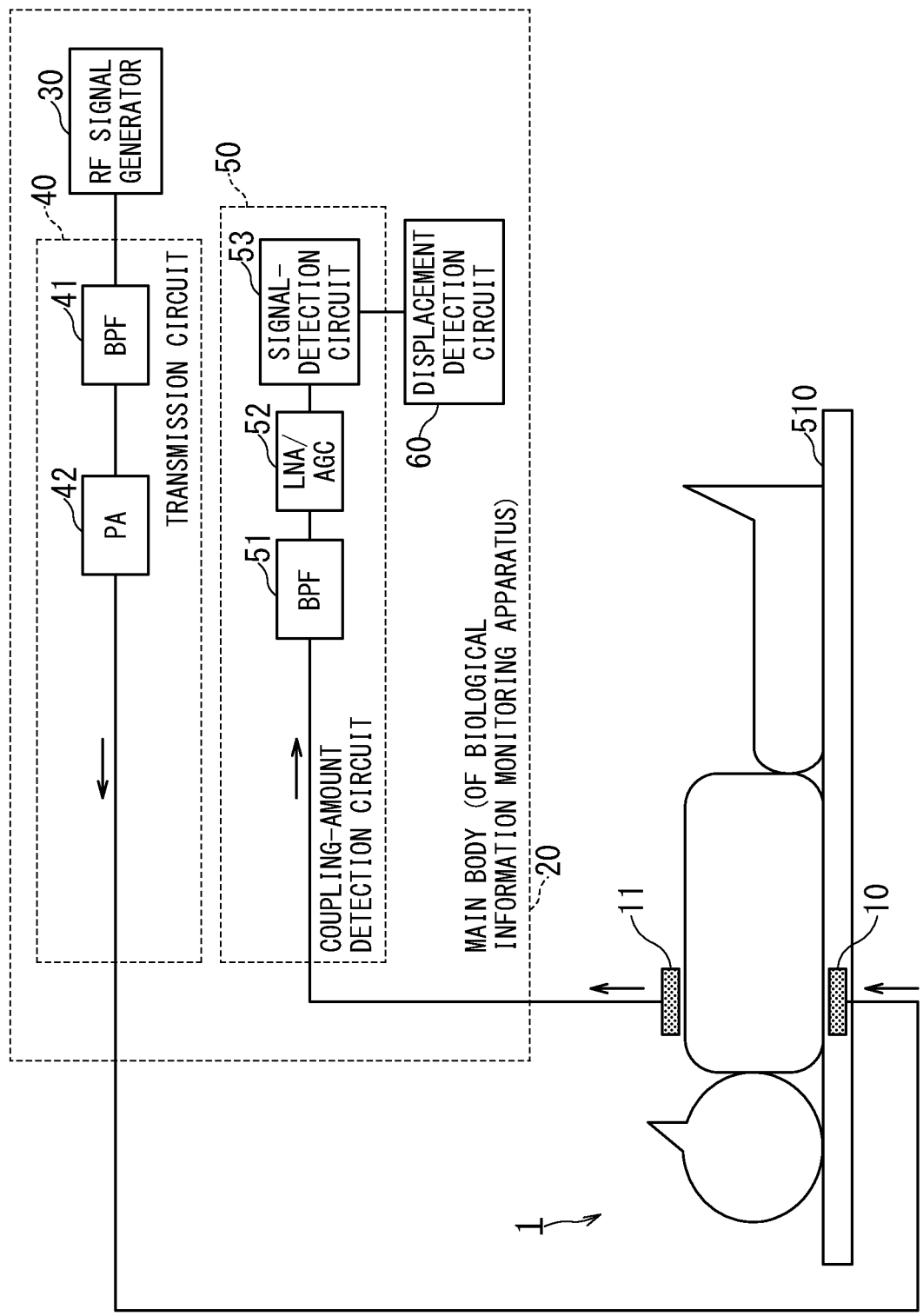
FIG. 6 is a block diagram illustrating an overall configuration of the biological information monitoring apparatus according to the second embodiment.

FIG. 6 is a block diagram illustrating an overall configuration of the biological information monitoring apparatus 1 according to the second embodiment. The biological information monitoring apparatus 1 of the first embodiment is provided with only one antenna 10 in principle, whereas the biological information monitoring apparatus 1 of the second embodiment is provided with at least two antennas including a transmission antenna (first antenna) 10 and a reception antenna (second antenna) 11.

As to configuration of the main body 20 (i.e., biological-information-monitoring main-body 20), the second embodiment is almost the same as the first embodiment, which includes the RF signal generator 30, the transmission circuit 40, the coupling-amount detection circuit 50, and the displacement detection circuit 60.

The main body 20 in the second embodiment differs from the first embodiment in that the transmission circuit 20 in the second embodiment does not include the directional coupler (DC) 43. The power amplifier (PA) 42 of the transmission circuit 40 and the transmission antenna 10 are directly connected without the directional coupler (DC) 43 inbetween. The band-pass filter (BPF) 51 of the coupling-amount detection circuit 50 and the reception antenna 11 are also directly connected without the directional coupler (DC) 43 inbetween.

The coupling-amount detection circuit 50 of the second embodiment uses the signal-detection circuit 53 to detect the transmitted signal, which is originally the high-frequency signal outputted from the RF signal generator 30 and transmitted from the transmission antenna 10 through the object to the reception antenna 11, so as to detect the amount of near-field coupling based on the magnitude of the transmitted signal.

Considering that the power outputted from the transmission circuit 40 to the transmission antenna 10 is a constant value, the coupling-amount detection circuit 50 equivalently detects the S21 parameter indicating the insertion loss from the transmission antenna 10 to the reception antenna 11.

Figure 7B:
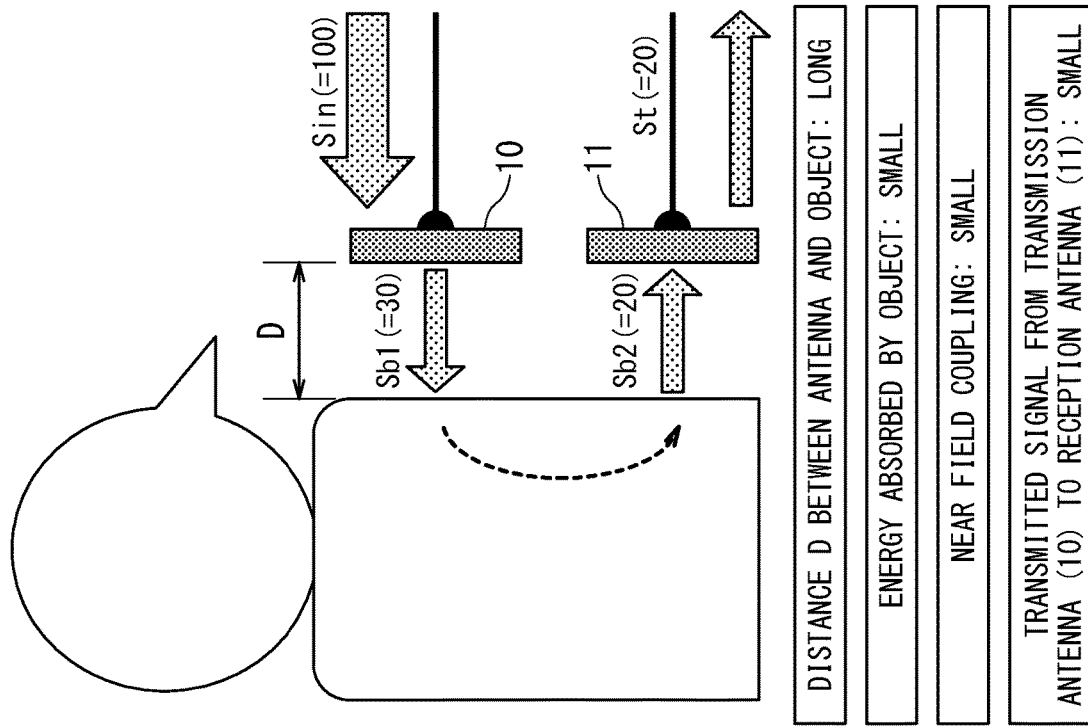
FIG. 7A and FIG. 7B are schematic diagrams illustrating the operation concept of the biological information monitoring apparatus according to the second embodiment.
Figure 7A:
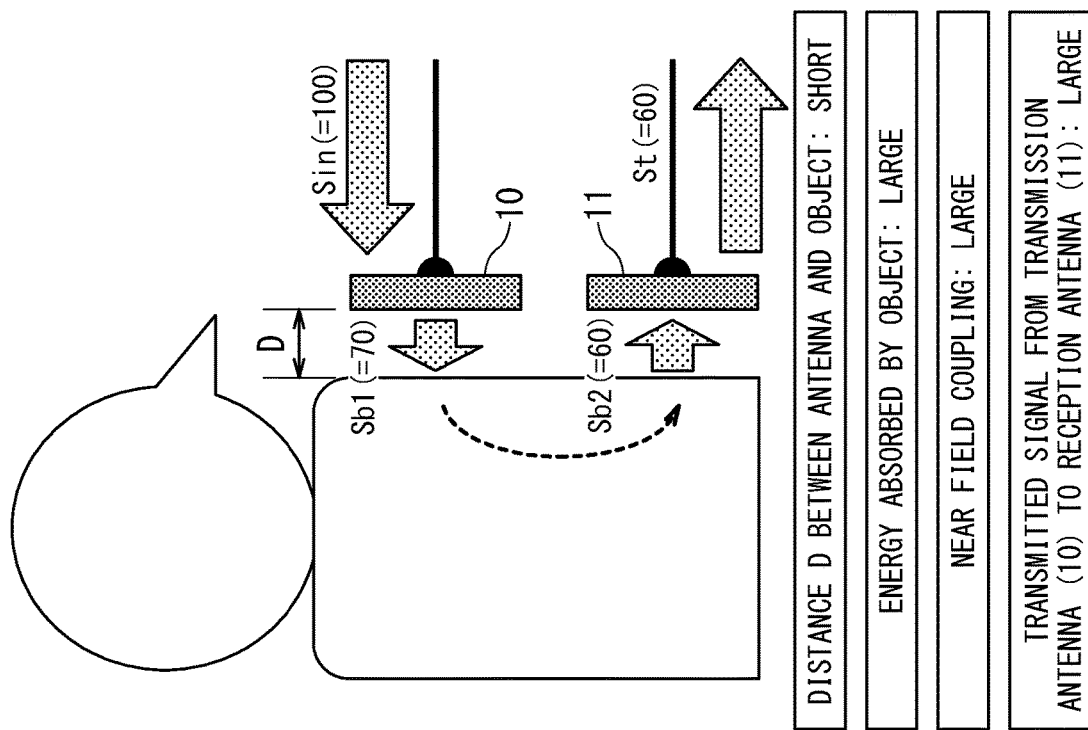

FIG. 7A and FIG. 7B are schematic diagrams illustrating the operation concept of the biological information monitoring apparatus 1 according to the second embodiment. FIG. 7A schematically illustrates the operation when the distance D between the object and the antenna 10 is short, while FIG. 7B schematically illustrates the operation when the distance D between the object and the antenna 10 is long. As mentioned above, the object (human body) has electrical conductivity. Thus, when the distance between the transmission antenna 10 and the object is short, the object (human body) more readily absorbs the energy from the transmission antenna 10. Hence, the energy absorbed from the transmission antenna 10 into the object increases. This means that the coupling amount of the near-field coupling between the object and the transmission antenna 10 is large.

Similarly, when the reception antenna 11 approaches the object, the energy inputted from the object to the reception antenna 11 also increases, which means that the coupling amount of the near-field coupling between the object and the reception antenna 11 is large. The power Sin inputted to the antenna 10 is absorbed by the object as the power Sb1, propagates the inside and the surface of the object, and is transmitted to the reception antenna 11 as the power Sb2. When the distance D is short, the power Sb1 absorbed from the transmission antenna 10 by the object increases, and accordingly, the power Sb2 emitted from the object to the input antenna 11 increases. For example, when the power Sin inputted to the transmission antenna 10 is assumed to be 100, the power Sb absorbed by the object from the transmission antenna 10 may become 70, and the power Sb2 emitted from the object to the reception antenna 11 may become 60, and thus the power St exiting from the reception antenna 11 may also become 60.

This means that the transmitted signal from the transmission antenna 10 to the reception antenna 11 increases and the insertion loss from the transmission antenna 10 to the reception antenna 11 decreases when the distance D between the object and the transmission antenna 10/the reception antenna 11 is short. In other words, the S21 parameter (when expressed as an antilogarithm value), which is an index of the insertion loss from the transmission antenna 10 to the reception antenna 11, shows a large value.

On the other hand, as shown in FIG. 7B, when the distance D between the transmission antenna 10 and the object increases, the object becomes less likely to absorb the energy from the transmission antenna 10. Thus, the energy absorbed by the object from the transmission antenna 10 decreases. This means that the amount of near-field coupling between the object and the reception antenna 11 is reduced. Similarly, when the distance D between the reception antenna 11 and the object increases, the energy inputted from the object to the reception antenna 11 also decreases. This means that the amount of near-field coupling between the object and the reception antenna 11 is also reduced. For example, when the power Sin inputted to the transmission antenna 10 is assumed to be 100, the power Sb absorbed by the object from the transmission antenna 10 may become 30, and the power Sb2 emitted from the object to the reception antenna 11 may become 20, and thus, the power St exiting from the reception antenna 11 becomes also 20.

This means that the transmitted signal from the transmission antenna 10 to the reception antenna 11 decreases and the insertion loss from the transmission antenna 10 to the reception antenna 11 increases when the distance D between the object and the transmission antenna 10/the reception antenna 11 is long. In other words, the S21 parameter (when expressed as an antilogarithm value), which is an index of the insertion loss from the transmission antenna 10 to the reception antenna 11, shows a small value.

FIG. 8A is a graph for illustrating actual measured values of a transmitted signal from the transmission antenna 10 to the reception antenna 11. In this graph, the horizontal axis indicates time and the vertical axis indicates amplitude of the transmitted signal. The transmitted signal in the second embodiment is similar to the reflected signal (FIG. 3A) in the first embodiment and has a waveform in which a short-period fluctuation waveform corresponding to heartbeat is superimposed on a relatively long-period fluctuation waveform corresponding to respiration. This transmitted signal is also detected by the signal-detection circuit 53 of the coupling-amount detection circuit 50 and then is outputted to the displacement detection circuit 60.

The displacement detection circuit 60 performs filtering processing and/or Fourier transform processing on the reflected signal detected by the signal-detection circuit 53 so as to extract the respective two frequency components corresponding to the respiratory motion and heartbeat, and then generates a respiratory waveform shown in FIG. 8B and a heartbeat waveform shown in FIG. 8C in a manner similar to the first embodiment.

FIG. 9A to FIG. 9D are schematic diagrams illustrating disposition of the transmission antenna 10 and the reception antenna 11 used in the biological information monitoring apparatus 1 of the second embodiment. Many variations of disposition and orientation of the transmission antenna 10 and the reception antenna 11 of the second embodiment are conceivable. As a basic idea, the transmission antenna 10 and the reception antenna 11 are desirably disposed so as to sandwich the body part where the body motion is more apparent to tell. For example, in the case of detecting heartbeat, the transmission antenna 10 and the reception antenna 11 are desirably disposed to sandwich the heart in any one of the anterior-posterior direction, the right-left direction, and the head-foot direction of the object.

Figure 9A:
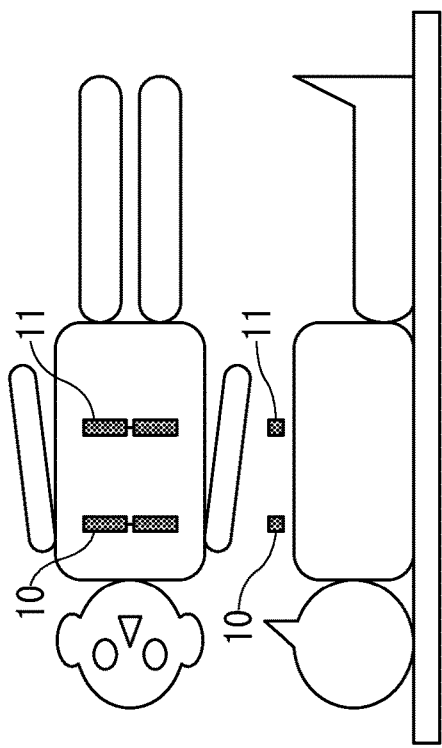
FIG. 9A to FIG. 9D are schematic diagrams illustrating disposition of the transmission antenna and the reception antenna to be used in the second embodiment.
Figure 9B:
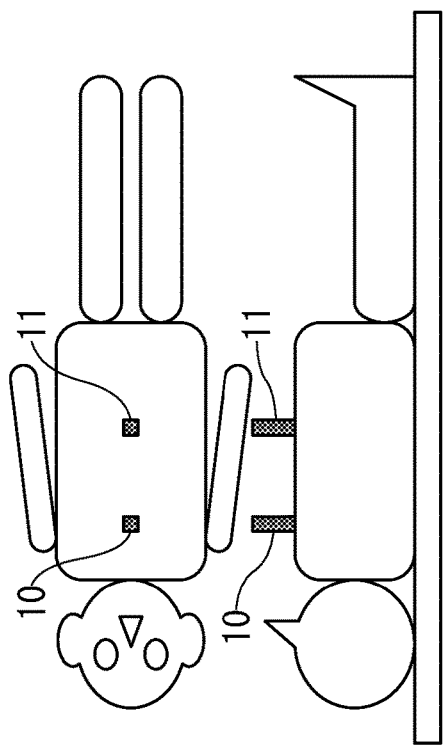
Figure 9C:
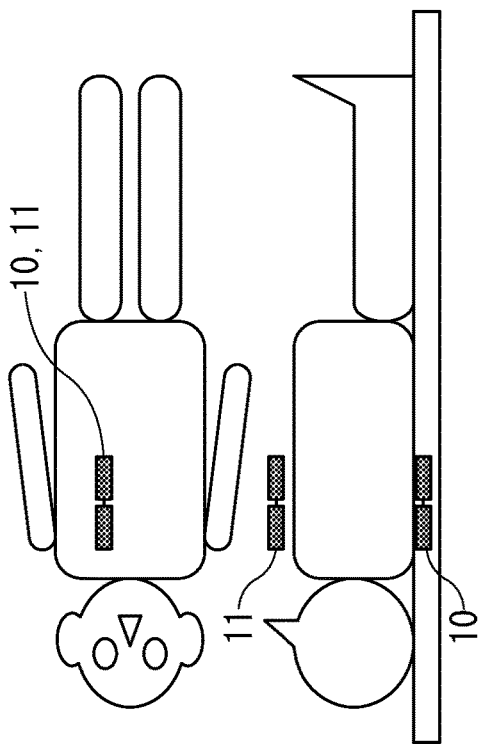
Figure 9D:
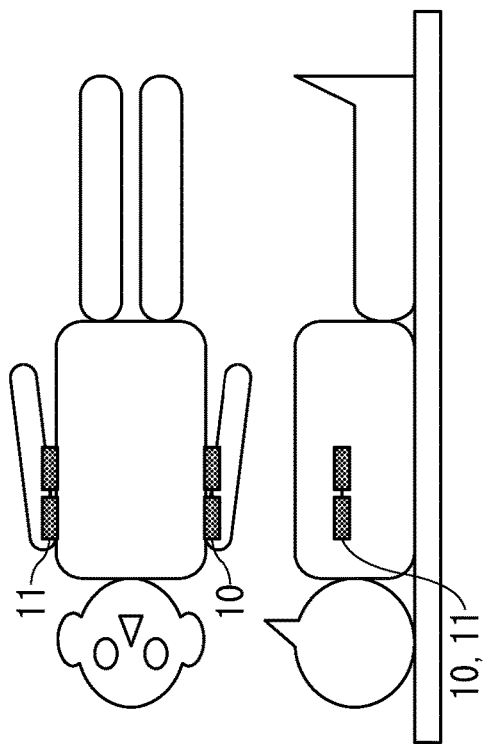

Each of FIG. 9A, FIG. 9B, and FIG. 9C illustrates a dipole antenna, and FIG. 9D illustrates a monopole antenna. FIG. 9A shows a disposition example in which the heart of the object is sandwiched between the transmission antenna 10 and the reception antenna 11 in the anterior-posterior direction.

FIG. 9B shows another disposition example in which the heart of the object is sandwiched between the transmission antenna 10 and the reception antenna 11 in the right-left direction.

FIG. 9C shows yet another disposition example in which the heart of the object is sandwiched between the transmission antenna 10 and the reception antenna 11 in the head-foot direction.

Meanwhile, FIG. 9D shows a disposition aspect in which the heart of the object is sandwiched between the transmission antenna 10 and the reception antenna 11, each of which is configured as a monopole antenna, in the head-foot direction.

Note that, there is no particular need to distinguish between the transmission antenna 10 and the reception antenna 11. In any of the disposition examples of FIG. 9A to FIG. 9D, the respective position of the transmission antenna 10 and reception antenna 11 can be interchanged.

The voltage standing wave ratio (VSWR) of the transmission antenna 10 used in the biological information monitoring apparatus 1 of the second embodiment is preferably set to, for example, a value between 2.0 and 5.0 similarly to the first embodiment. By contrast, as for the reception antenna 11, lower VSWR value of 2.0 or less, for example, is preferred.

Third Embodiment

Figure 10:
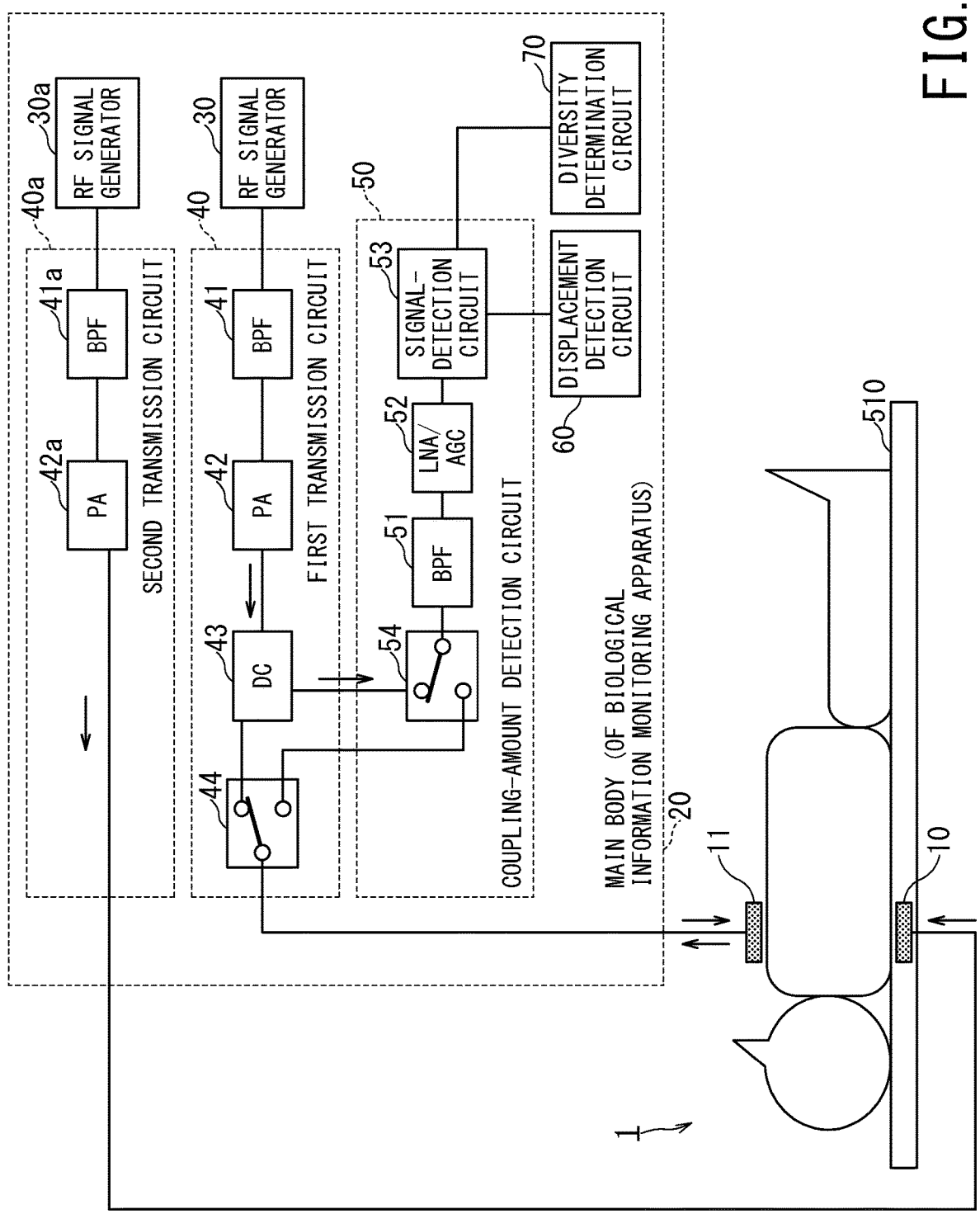
FIG. 10 is a block diagram illustrating an overall configuration of the biological information monitoring apparatus according to the third embodiment.

FIG. 10 is a configuration diagram illustrating an overall configuration of the biological information monitoring apparatus 1 according to the third embodiment. The biological information monitoring apparatus 1 of the third embodiment is a combination of the first embodiment and the second embodiment. Specifically, the third embodiment is configured to be able to select either one of the first mode corresponding to the first embodiment and the second mode corresponding to the second embodiment.

In the first mode, a high-frequency signal is inputted to the antenna 11, and the motion of the object such as heartbeat and/or respiration is measured based on the reflected signal from the antenna 11 or the S11 parameter of the antenna 11. In the second mode, a high-frequency signal is inputted to the antenna 10, and the motion of the object such as heartbeat and/or respiration is measured based on the transmitted signal or the S21 parameter from the antenna 10 to the antenna 11 or The RF signal generator 30 and the first transmission circuit 40 are configurations corresponding to the function of generating a high-frequency signal in the first mode. On the other hand, the RF signal generator 30a and the second transmission circuit 40a are configurations corresponding to the function of generating a high-frequency signal in the second mode. The coupling-amount detection circuit 50 is used in common in both of the first mode and the second mode.

The diversity determination circuit 70 monitors the reflected signal detected in the first mode and the transmitted signal detected in the second mode, and selects either one of the first mode and the second mode. When monitoring the reflected signal in the first mode, the diversity determination circuit 70 switches both of the switch 44 of the first transmission circuit 40 and the switch 54 of the coupling-amount detection circuit 50 to the side of the directional coupler 43 in the state as shown in FIG. 10. When monitoring the transmitted signal in the second mode, the diversity determination circuit 70 switches the switches 44 and 54 to the opposite sides in a state shown in FIG. 10.

The diversity determination circuit 70 compares the fluctuation range (i.e., amplitude of fluctuations) of the reflected signal in the first mode with the fluctuation range of the transmitted signal in the second mode, and selects the mode having the larger fluctuation range. For example, when it is determined that the monitored fluctuation range of the reflected signal is larger than the monitored fluctuation range of the transmitted signal, the diversity determination circuit 70 selects the first mode. Alternatively, the diversity determination circuit 70 may individually perform Fourier transform on the reflected signal and the transmitted signal, and then may select the mode in which the frequency component corresponding to the heartbeat is larger, or may select the mode in which the frequency component corresponding to the respiration is larger.

After selecting either one of the first mode and the second mode, the diversity determination circuit 70 sets and fixes the switches 44 and 54 to the state corresponding to the selected mode, then measures either one of the reflected signal and transmitted signal under the selected mode, and then detects the body motion signal such as heartbeat and a respiratory motion.

Modification of Third Embodiment

The biological information monitoring apparatus 1 of the modification of the third embodiment performs diversity processing by using two or more antennas 10 and 11. In this diversity processing, one antenna that detects the body motion signal with maximum sensitivity is selected or a combination of two or more antennas that can detect the body motion signal with maximum sensitivity is selected.

Figure 11A:
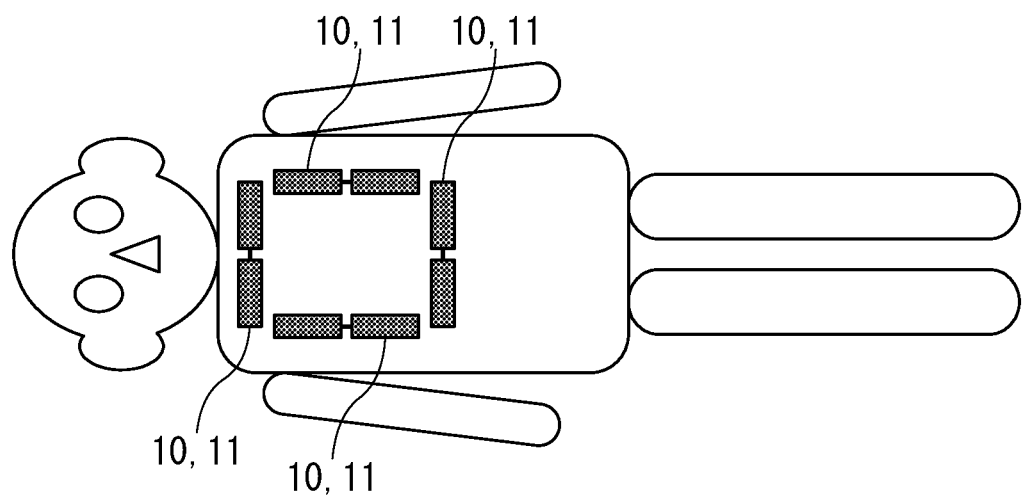
FIG. 11A and FIG. 11B are schematic diagrams illustrating disposition of four antennas for performing diversity processing.
Figure 11B:
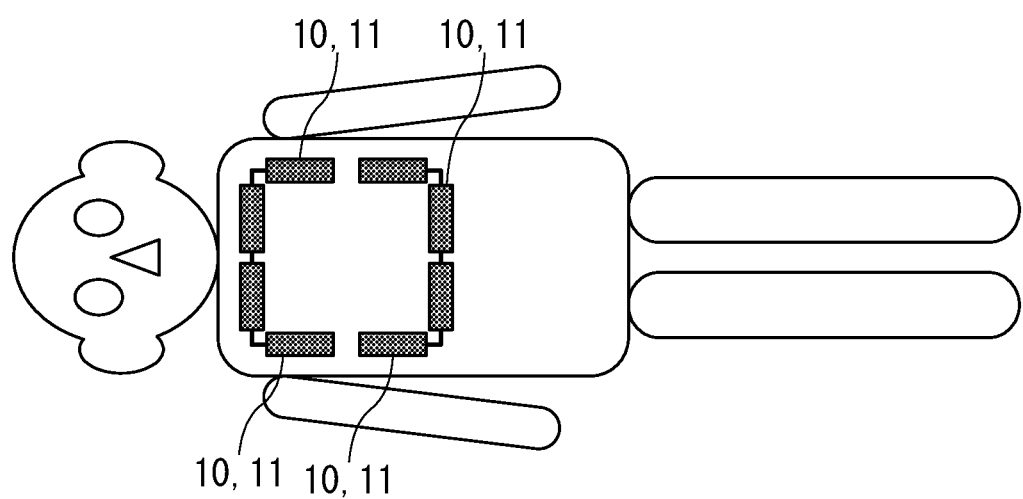

FIG. 11A and FIG. 11B are schematic diagrams illustrating disposition of four antennas for performing the diversity processing. In this case, for example, as shown in FIG. 11A, four dipole antennas 10 and 11 may be disposed to surround the heart. Further, as shown in FIG. 11B, each of the dipole antennas 10 and 11 bent at a substantially right angle at the center may be disposed to surround the heart.

In the case of performing the diversity processing by using the biological information monitoring apparatus 1 of the first embodiment, or in the case of performing the diversity processing in the first mode of the third embodiment, one antenna that can detect the body motion signal with maximum sensitivity is selected among the four antennas.

Alternatively, in the case of performing the diversity processing by using the biological information monitoring apparatus 1 of the second embodiment, or in the case of performing the diversity processing in the second mode of the third embodiment, for example, one antenna is selected as a transmission antenna 10, while one antenna capable of detecting the body motion signal with maximum sensitivity is selected among the remaining three antennas as a reception antennas 11, or the remaining three antennas are arbitrarily combined as a synthesized reception antenna 11 to perform a synthetic antenna processing.

In the modification of the third embodiment, for example, a circuit having a function similar to that of the diversity determination circuit 70 shown in FIG. 10 may be provided so that this circuit performs the above-described antenna-selection processing and/or synthetic antenna processing.

(MRI Apparatus)

Figure 12:
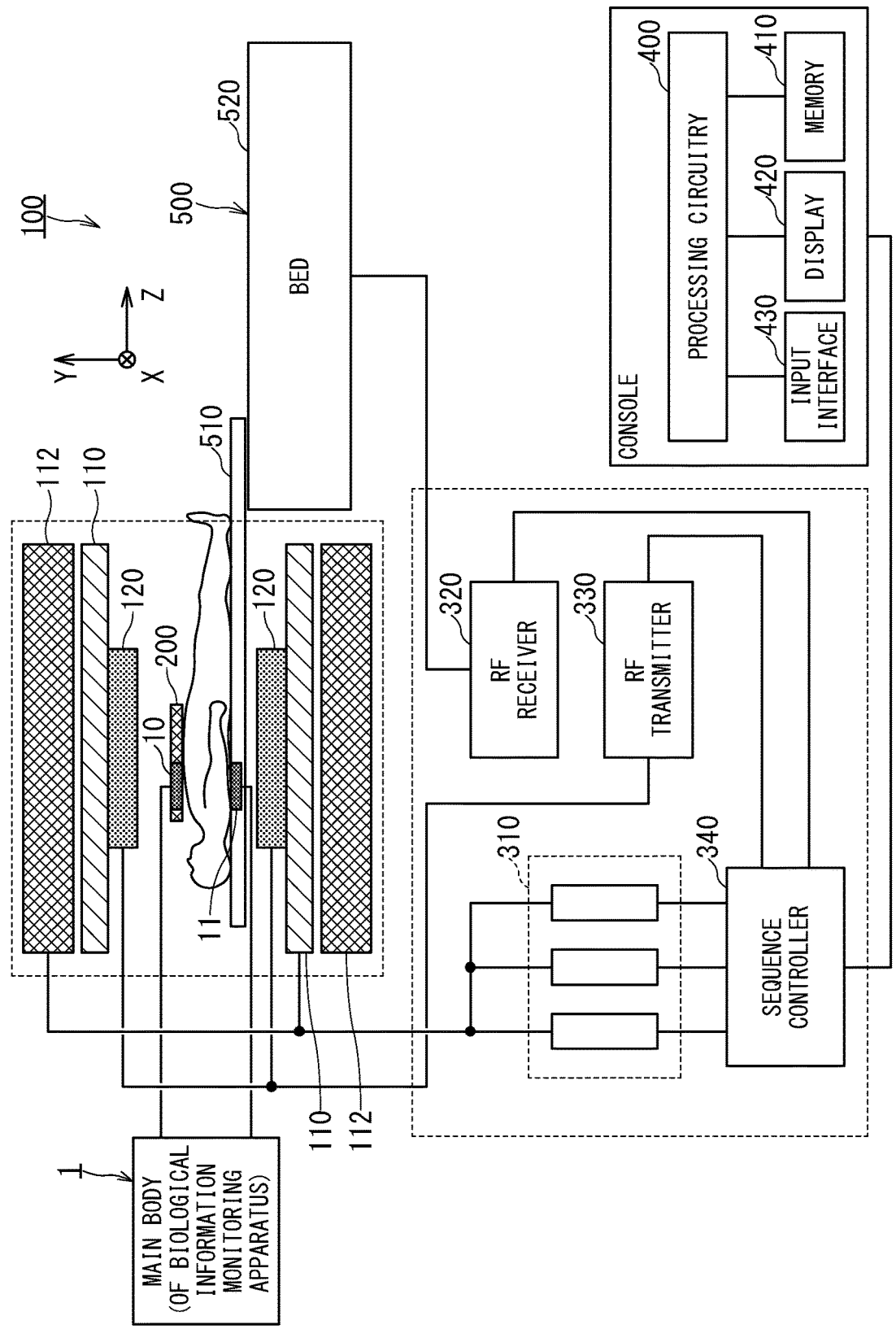
FIG. 12 is a configuration diagram illustrating an MRI apparatus provided with the biological information monitoring apparatus of one of the embodiments.

FIG. 12 is a configuration diagram illustrating an MRI apparatus 100 that is provided with the biological information monitoring apparatus 1 according to each embodiment described above.

The MRI apparatus 100 includes a static magnetic field magnet 112, a gradient coil 110, and a whole body (WB) coil 120, and these components are housed in a cylindrical housing. The MRI apparatus 100 also includes: a bed 500 provided with a bed body 520 and a table 510; and at least one RF coil 200 disposed close to the object. The RF coil 200 is also referred to as a local coil or surface coil.

The MRI apparatus 100 further includes a gradient coil power supply 310, an RF receiver 320, an RF transmitter 330, and a sequence controller 340. The MRI apparatus 100 further includes a console, i.e., a computer that is provided with processing circuitry 400, a memory 410, a display 420, and an input interface 430.

The biological information monitoring apparatus 1 includes the antennas 10 and 11 in addition to the main body 20 shown in FIG. 1, FIG. 6, and FIG. 10. The antennas 10 and 11 are disposed close to the object but are not required to be directly attached to the skin of the object. Although the antennas 10 and 11 may be individually disposed in the vicinity of the object, the antennas 10 and 11 may be embedded in the RF coil 200 as shown in FIG. 12 or may be embedded in the table 510.

FIG. 13A is a block diagram illustrating a configuration of the biological information monitoring apparatus 1, which is used in the MRI apparatus 100. Although the MRI apparatus 100 can be applied to any of the above-described embodiments, FIG. 13A illustrates the biological information monitoring apparatus 1 of the second embodiment.

The MRI apparatus 100 can prospectively acquire MR signals based on the physical displacement of the object detected by the biological information monitoring apparatus 1. For example, a synchronization signal corresponding to an R wave can be generated from the heartbeat signal detected by the biological information monitoring apparatus 1, and the MR signals can be prospectively acquired using the synchronization signal.

Further, the MRI apparatus 100 may retrospectively reconstruct the MR signals acquired by the MRI apparatus 100 based on the physical displacement of the object detected by the biological information monitoring apparatus 1.

In the MRI apparatus 100, the RF transmitter 330 outputs an RF pulse for causing magnetic resonance with very high power, and the RF pulse is emitted from the WB coil 120 toward the object. With this emission, very large RF power is inputted to the main body 20 of the biological information monitoring apparatus 1 via the antennas 10 and 11.

Thus, in the biological information monitoring apparatus 1 used in the MRI apparatus 100, the protection switches 45 and 55 are respectively provided at the output terminal of the transmission circuit 40 and the input terminal of the coupling-amount detection circuit 50. The protection switches 45 and 55 are turned on and off by using a control signal sent from the main body of the MRI apparatus 100.

FIG. 13B is a schematic diagram illustrating a transmission/reception period of a high-frequency signal for biological monitoring. As shown in FIG. 13B, in order to avoid interference between the MRI apparatus 100 and the biological information monitoring apparatus 1, the high-frequency signal for biological monitoring is transmitted and received during a period excluding the transmission time of each RF pulse for causing magnetic resonance and the reception time of each MR signal.

The repetition period T of the transmission/reception time of the high-frequency signal for biological monitoring can be defined according to the heartbeat cycle and/or the respiratory cycle. The frequency of heartbeat can be assumed to be approximately 2 Hz or less, and the frequency of respiration can be assumed to be approximately 0.5 Hz or less. By using the sampling theorem, when sampling is performed at twice the higher frequency, i.e., at a frequency of 4 Hz or higher, the waveform of the heartbeat and the respiration can be accurately extracted. Thus, the repetition period T may be set to 250 ms (=1/(4 Hz)) or less.

It is preferred that the frequency of the high-frequency signal for biological monitoring is higher than the Larmor frequency used for the MRI apparatus 100. When the frequency of the high-frequency signal for biological monitoring is set to be higher than the Larmor frequency, not only the high frequency signal itself but also its harmonics can be prevented from entering the reception band of MR signal of the MRI apparatus 100.

Figure 14A:
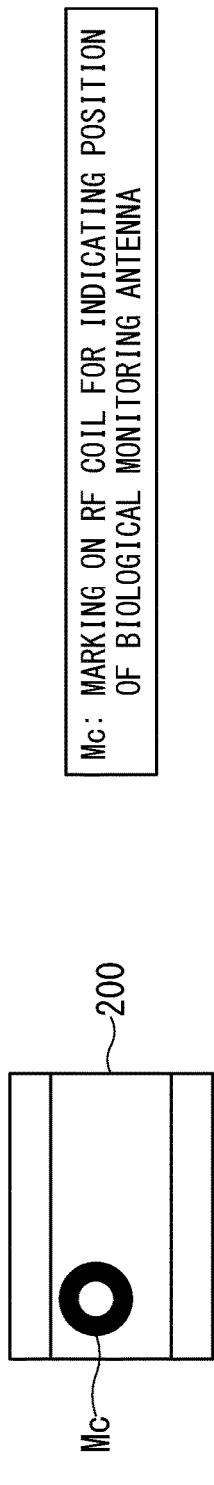
FIG. 14A is a schematic diagram illustrating marking that is performed on the RF coil to indicate the position of the antenna.
Figure 14B:
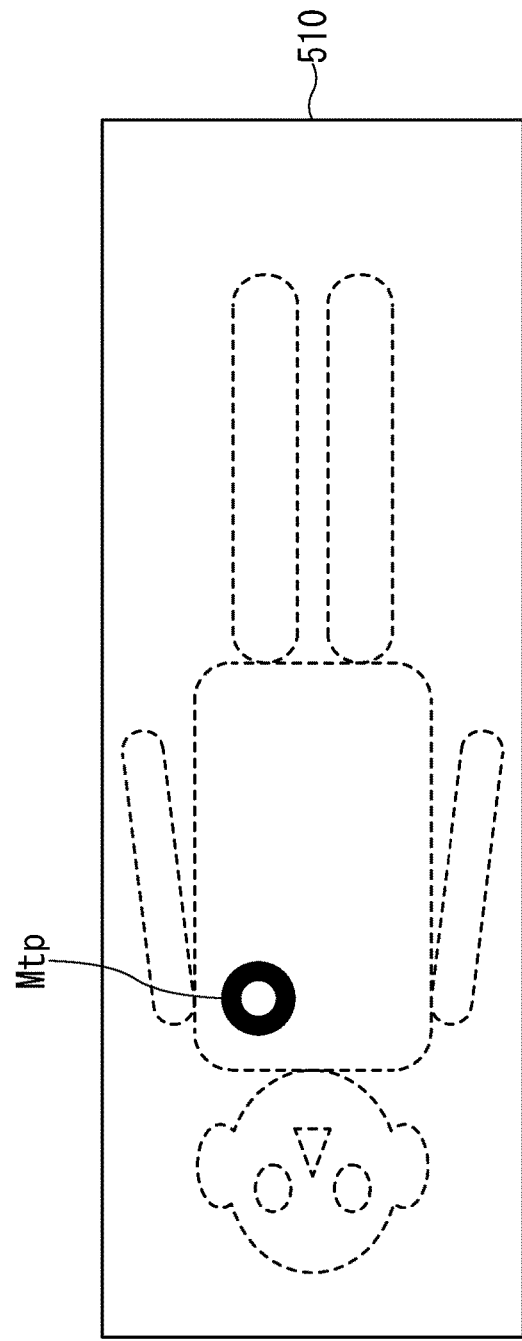
FIG. 14B is a schematic diagram illustrating marking that is performed on the table to indicate the position of the antenna.

FIG. 14A is a schematic diagram illustrating marking that is performed on the RF coil 200 to indicate the position of the antennas 10 and 11, and FIG. 14B is a schematic diagram illustrating marking that is performed on the table 510 to indicate the position of the antennas 10 and 11. As described above, the antennas 10 and 11 of the biological information monitoring apparatus 1 can be mounted by being embedded in the RF coil 200 or the table 510 of the bed 500. In the case of measuring heartbeat, it is preferred that the antennas 10 and 11 are disposed near the heart of the object. Thus, marking is preferably provided such that a user can readily and visually recognize the antennas 10 and 11 embedded in the RF coil 200 and/or table 510, and the respective positions of the object and the RF coil 200 are preferably to be further adjusted such that this marking is near the heart of the object.

First Embodiment of Antenna with Conductor Element

So far, as shown in FIG. 5A to FIG. 5D, FIG. 9A to FIG. 9D, FIG. 11A, and FIG. 11B, the dipole antenna has been described as an embodiment of the antenna 10 (or antenna 11) to be used in the biological information monitoring apparatus 1.

Most of the conventional antennas using a dipole antenna as an antenna element are configured to feed a high-frequency signal to the dipole antenna via a coaxial line (for example, a coaxial cable).

Figure 15B:
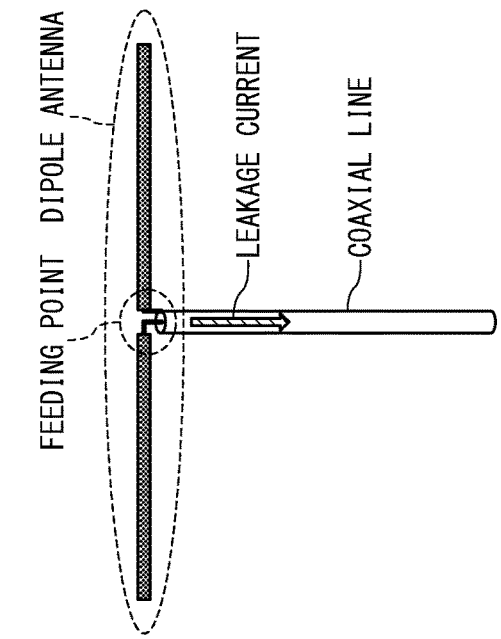
FIG. 15A to FIG. 15C are schematic diagrams illustrating a problem of the conventional antenna.
Figure 15C:
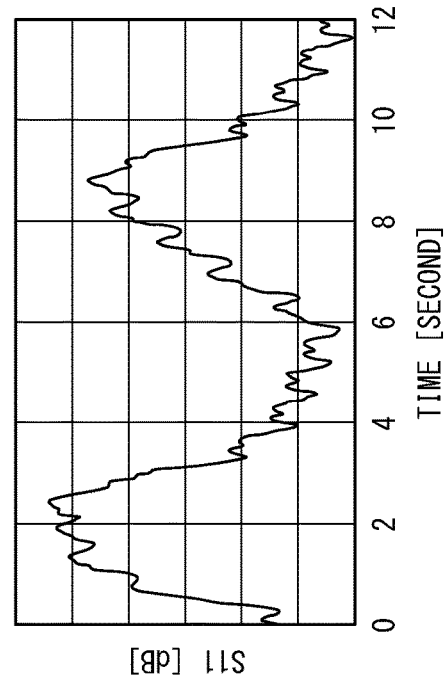
Figure 15A:
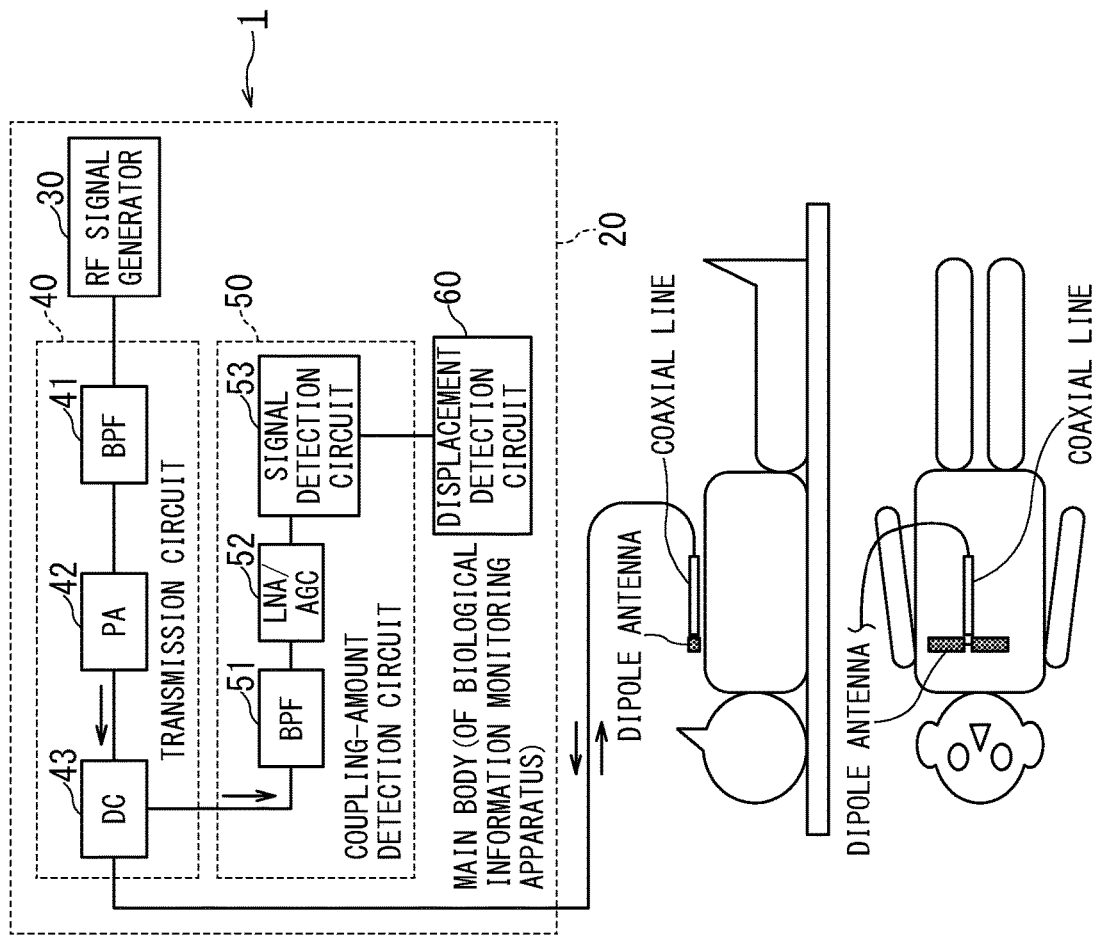

FIG. 15A to FIG. 15C are diagrams illustrating a problem of a conventional antenna having such a configuration. FIG. 15A illustrates a situation in which the biological information monitoring apparatus 1 measures the heartbeat and/or respiratory motions of the object by using the conventional antenna placed on the chest of the object.

FIG. 15B is a diagram illustrating a configuration of the conventional antenna in which a high-frequency signal is fed to a dipole antenna via a coaxial line. As is well known, a dipole antenna is a balanced circuit, whereas a coaxial line is an unbalanced circuit. Thus, leakage current occurring at the feeding point, which is the boundary between the balanced circuit and the unbalanced circuit (i.e., boundary between the dipole antenna and the coaxial line), flows to the outer conductor of the coaxial line.

When measuring the heartbeat and/or respiration of the object, the antenna is placed on the object as described above, and the coaxial line near the feeding point is disposed on the object (for example, on the chest or abdomen of the object) together with the dipole antenna.

Thus, the leakage current flowing through the outer conductor of the coaxial line and the current through the dipole antenna is coupled with the object, resulting in that the return loss (i.e., S11 parameter) of the antenna fluctuates depending on the motion of the surface of the object.

For example, when the outer conductor of the coaxial line approaches the abdomen of the object as illustrated in FIG. 15A, because the fluctuation of the abdomen due to respiration is larger than the fluctuation of the chest due to the heartbeat, the influence of the abdomen on the S11 parameter caused by the above-described leakage current becomes larger.

Hence, as shown in the graph of FIG. 15C, it is hard to tell the fluctuation of the S11 parameter due to the heartbeat (fluctuation with a short cycle) covered by (or, is buried in) the fluctuation of the S11 parameter due to the respiration (fluctuation with a long cycle), which makes it difficult to capture the motion of the heartbeat.

With respect to this problem, the present inventors have found that the leakage current flowing through the outer conductor can be reduced by configuring the antenna of the biological information monitoring apparatus 1 as an antenna 10 provided with a conductor element 104 having a quarter wavelength, and this configuration can solve the above-described problem.

Hereinafter, various embodiments of the antenna 10 with the conductor element 104 having a ¼ wavelength will be described by referring to FIG. 16 to FIG. 22B. Although the antenna is illustrated as a transmission/reception antenna for detecting the S11 parameter in FIG. 15A, the antenna can also be used as the reception antenna 11 and the transmission antenna 10 for detecting the S21 parameter.

Figure 16:
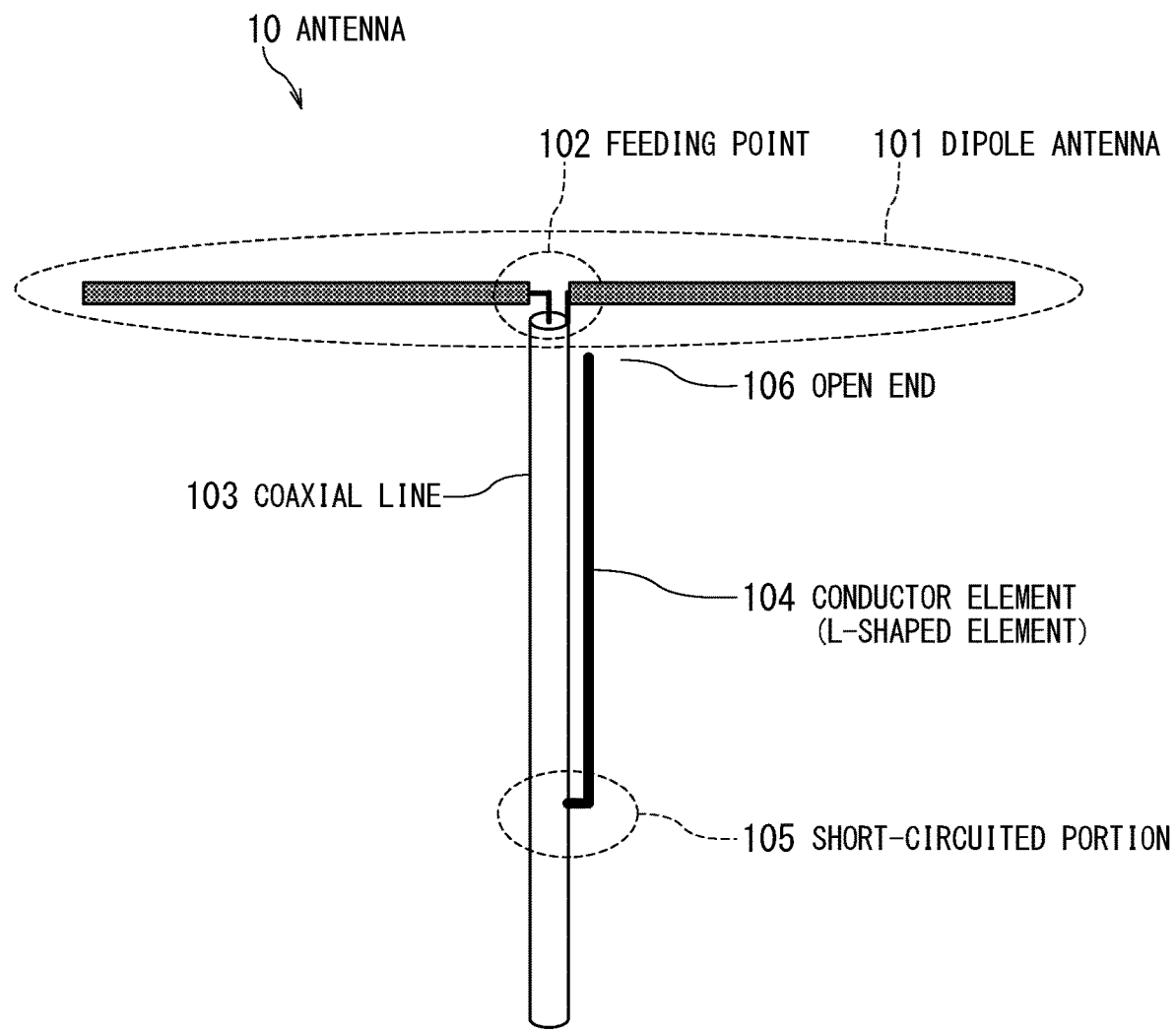
FIG. 16 is a schematic diagram illustrating appearance and configuration of an antenna according to the first embodiment.

FIG. 16 is a diagram illustrating appearance and configuration of the antenna 10 with a conductor element 104 having a quarter wavelength in the first embodiment. The antenna 10 includes a dipole antenna 101, a coaxial line 103, and a conductor element 104.

A feeding point 102 is provided in the center of the dipole antenna 101. The high-frequency signal supplied from the main body 20 of the biological information monitoring apparatus 1 is supplied to the feeding point 102 via the coaxial line 103.

The coaxial line 103 is, for example, a coaxial cable having a configuration in which its outer conductor is composed of woven thin conducting wires called braided wires and the outer surface of the outer conductor is covered with an insulating protective film such as a vinyl called a sheath. The coaxial line 103 may be configured as a so-called semi-rigid cable, i.e., coaxial cable in which a seamless metal tube is used as an outer conductor and the outer conductor is exposed to the outside.

The conductor element 104 is a line-shaped conductor or a band-shaped conductor, which length is approximately ¼ wavelength. One end of the conductor element 104 is configured as a short-circuited portion 105 that is short-circuited to the outer conductor of the coaxial line 103, and the other end of the conductor element 104 is configured as an open end 106.

The conductor element 104 can be configured as, for example, an L-shaped element 104. The L-shaped element 104 has: a short-axis portion in which one end of a line-shaped or band-shaped conductor is bent to be shorter than the remaining portion; and a long-axis portion that is the remaining portion. The tip of the short-axis portion of the L-shaped element 104 is short-circuited to the outer conductor of the coaxial line 103, and the long-axis portion is disposed substantially in parallel with the coaxial line 103 at a predetermined interval.

As illustrated in FIG. 16, the conductor element 104 is opened on its one end closer to the feeding point 102 of the dipole antenna 101, and is short-circuited to the outer conductor of the coaxial line 103 on its opposite end that is farther from the feeding point 102 of the dipole antenna 101.

Figure 17:
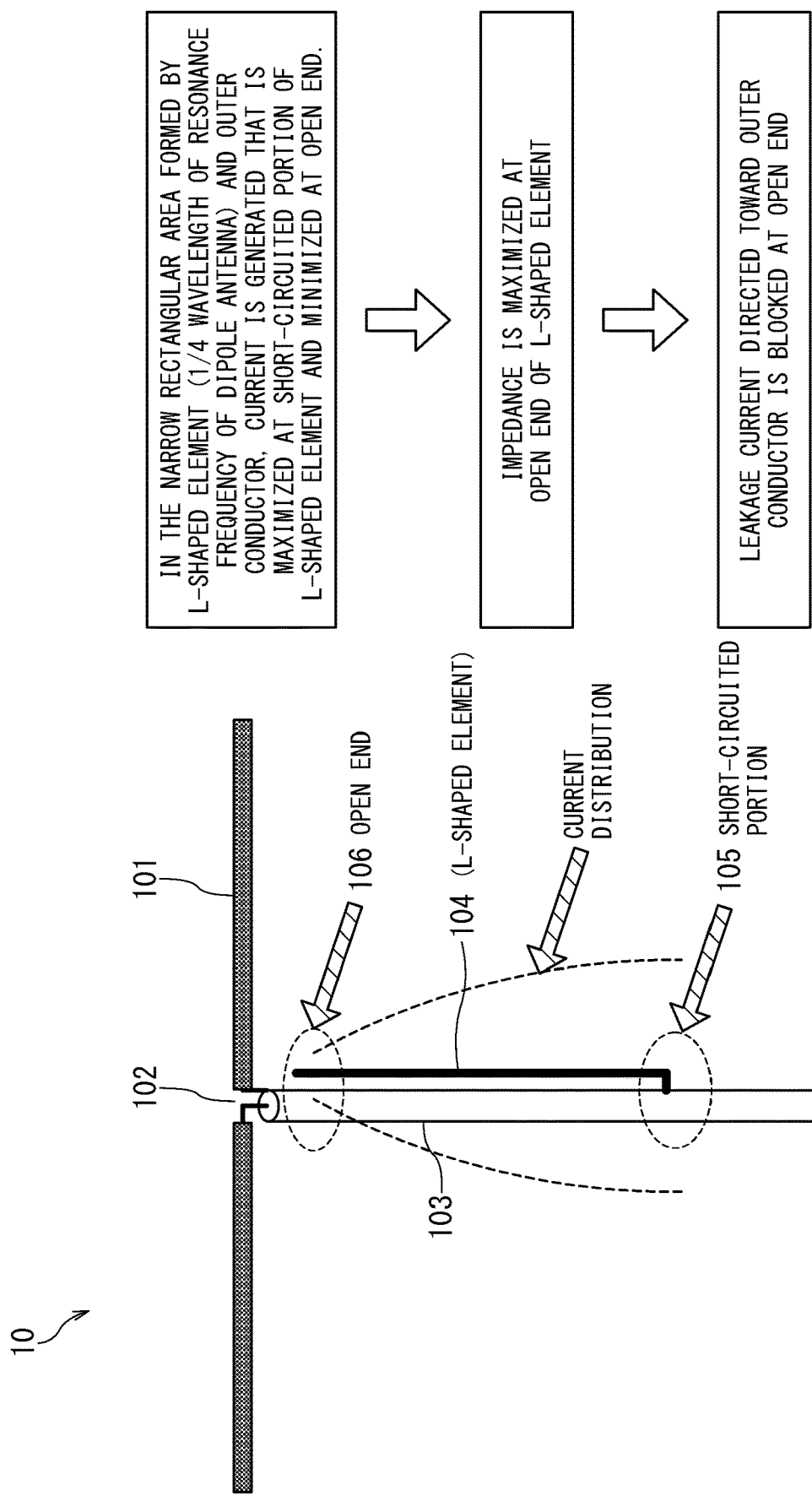
FIG. 17 is a schematic diagram illustrating the functions and effects of the antenna according to the first embodiment.

FIG. 17 illustrates the functions and effects of the antenna 10 according to the first embodiment. Note that FIG. 17 is a diagram showing the current distribution of the antenna 10 in FIG. 16 by a broken line. The current distribution shown in FIG. 17 is the distribution of the current that is generated in a narrow rectangular area formed by the outer conductor and the L-shaped element 104.

In the narrow rectangular area formed by the outer conductor and the L-shaped element 104 having a length of ¼ wavelength of the resonance frequency of the dipole antenna 101, generation of an electric current is maximized at the short-circuited portion 105 of the L-shaped element 104 and is minimized at the open end 106.

Thus, the impedance of the rectangular portion formed by the outer conductor and the L-shaped element 104 as viewed from the feeding point 102 is maximum at the open end 106 of the L-shaped element 104.

As a result, the leakage current flowing in the outer conductor direction is blocked at the open end 106, and the leakage current flowing through the outer conductor can be suppressed.

Conventionally, a means called a sleeve balun is known for suppressing a leakage current from a dipole antenna to an outer conductor. The sleeve balun is composed of a cylindrical conductor that covers the outer surface of the coaxial line near the feeding point of the dipole antenna. While the conventional sleeve balun has a three-dimensional structure, the L-shaped element 104 of the present embodiment has a planar structure such as a line-shaped conductor and a band-shaped conductor. Thus, the manufacturing process of the antenna 10 of the present embodiment is simplified as compared with the conventional antenna using the sleeve balun.

Figures 18A, 18B:
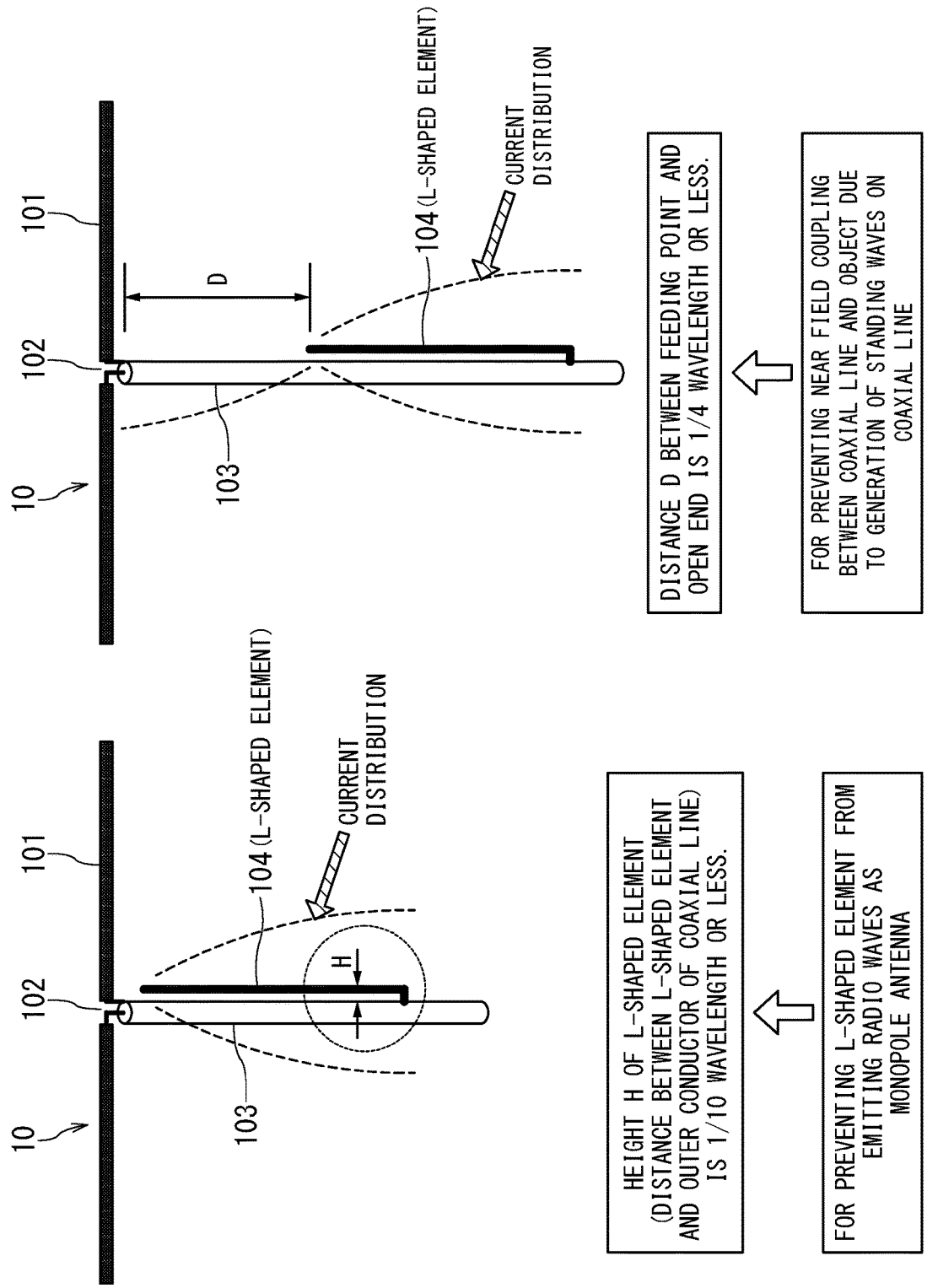
FIG. 18A and FIG. 18B are schematic diagrams illustrating restrictions on the structure of the antenna of the first embodiment.

FIG. 18A and FIG. 18B illustrate restrictions on the structure of the antenna 10 according to the first embodiment. FIG. 18A is a schematic diagram illustrating a restriction on the height H of the L-shaped element 104 (i.e., distance between the L-shaped element 104 and the outer conductor of the coaxial line 103).

As shown in FIG. 18A, the height H of the L-shaped element 104 is preferably ¹⁄₁₀ wavelength or less, because such setting can prevent the L-shaped element 104 from radiating radio waves as a monopole antenna.

FIG. 18B is a schematic diagram illustrating a restriction on the distance D between the feeding point 102 and the open end 106 of the L-shaped element 104.

As shown in FIG. 18B, the distance D between the feeding point 102 and the open end 106 of the L-shaped element 104 is preferably ¼ wavelength or less, because such setting can prevent a standing wave from being generated on the coaxial line 103 so as to prevent near-field coupling between the coaxial line 103 and the object.

Figures 19A, 19B:
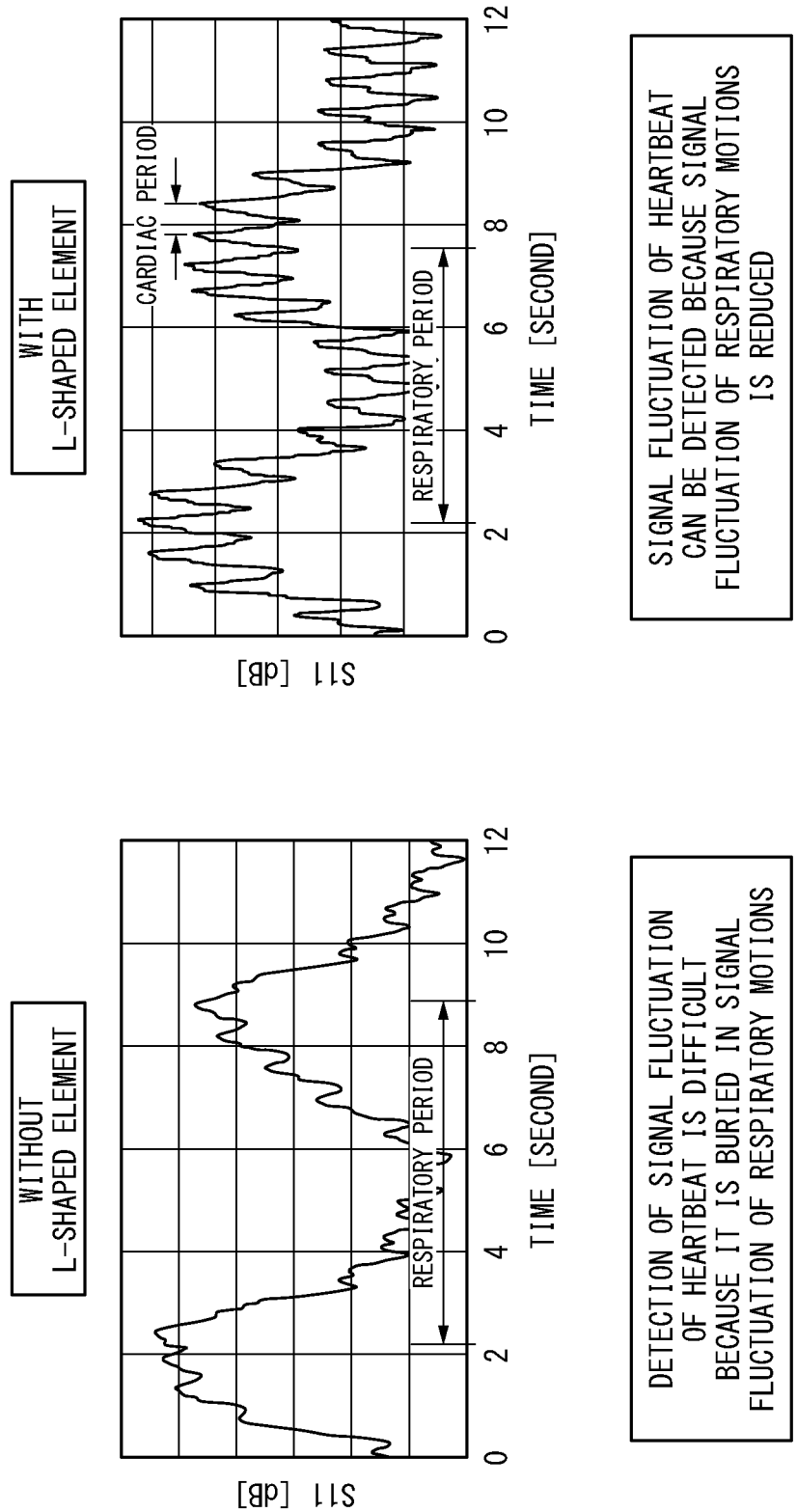
FIG. 19A and FIG. 19B are graphs illustrating the technical effects of the antenna according to the first embodiment.

FIG. 19A and FIG. 19B are graphs illustrating the technical effects of the antenna 10 according to the first embodiment. Each graph of FIG. 19A and FIG. 19B illustrates actual measured data indicating the time fluctuation of the S11 parameter measured by the biological information monitoring apparatus 1. For comparison with the antenna 10 of the present embodiment, FIG. 19A shows the time fluctuation of the S11 parameter measured by using a conventional antenna without the L-shaped element 104. FIG. 19B shows the time fluctuation of the S11 parameter measured by using the antenna 10 of the present embodiment having the L-shaped element 104.

Of the time fluctuations of the S11 parameters shown in FIG. 19A and FIG. 19B, the time fluctuation having a longer cycle of about 5 to 10 seconds is caused by the respiratory motions of the abdomen, and the time fluctuation with a shorter cycle of 1 second or less is caused by the motion due to the heartbeat.

As shown in FIG. 19A, in the S11 parameter measured by using the conventional antenna without the L-shaped element 104, the signal fluctuation due to the heartbeat is buried in the signal fluctuation due to the respiratory motions and is difficult to be detected.

By contrast, as is clear from FIG. 19B, in the S11 parameter measured by using the antenna 10 of the present embodiment having the L-shaped element 104, the influence due to the respiratory motions is reduced, and thus, the signal fluctuation due to the heartbeat can be readily detected.

As described above, the antenna 10 of the present embodiment having the conductor element 104 (for example, the L-shaped element 104) can suppress the leakage current generated at the feeding point 102, which is the boundary between the dipole antenna 101 and the coaxial line 103. As a result, the influence of the respiratory motion is reduced, and the signal fluctuation due to the heartbeat can be readily detected.

Second Embodiment of Antenna with Conductor Element

Figure 20B:
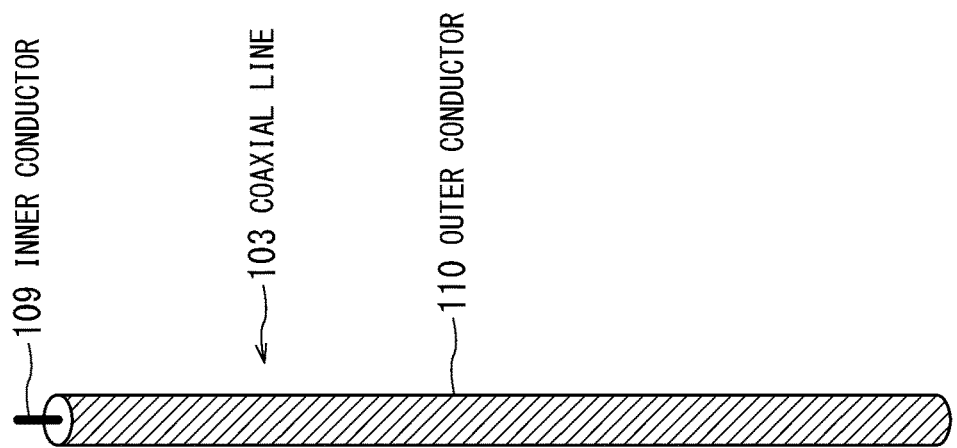
FIG. 20A and FIG. 20B are schematic diagrams illustrating a configuration of the antenna according to the second embodiment.
Figure 20A:
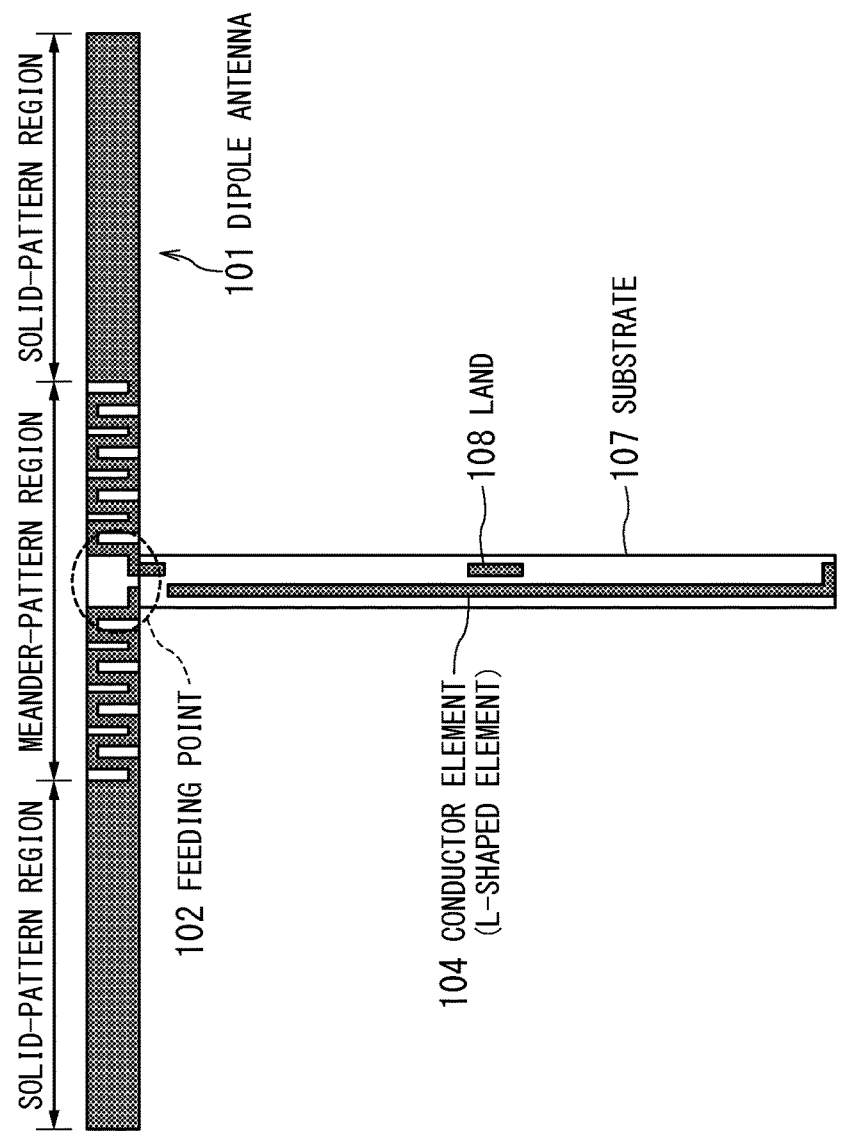
Figure 21:
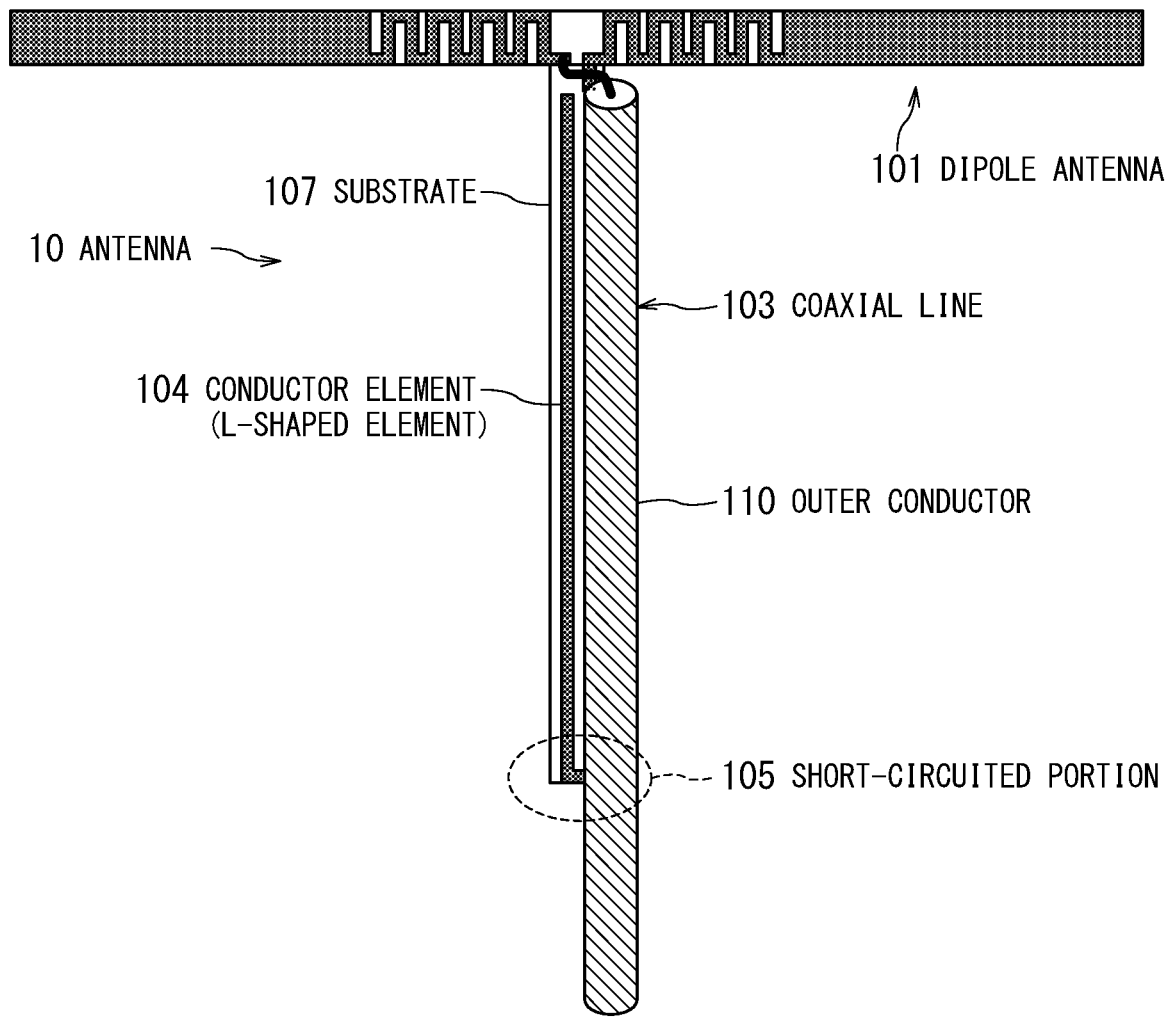
FIG. 21 is another schematic diagram illustrating a configuration of the antenna according to the second embodiment.

Each of FIG. 20A, FIG. 20B, and FIG. 21 is a schematic diagram illustrating a configuration of the antenna with a conductor element in the second embodiment. As shown in FIG. 20A, the antenna 10 of the second embodiment is configured to form the portion excluding the coaxial line 103 (i.e., form the dipole antenna 101 and the conductor element 104, such as an L-shaped element 104) on the substrate 107.

FIG. 20B shows the coaxial line 103 to be fixed to the substrate 107. The coaxial line 103 has an inner conductor 109 in the center and an outer conductor 110 on the outer surface. The outer conductor 110 may be exposed to the outside like the coaxial cable shown in FIG. 20B, such as a semi-rigid cable. Or, the outer conductor 110 may have an insulating sheath made of, for example, vinyl provided on its outer surface. The substrate 107 is formed in a T shape with a lateral member where the dipole antenna 101 is formed, and a longitudinal member, where the conductor element 104 is formed.

Each of the dipole antenna 101 and the conductor element 104 is formed by, for example, etching a copper foil provided on one surface of the substrate 107.

The entire surface of the dipole antenna 101 may be formed as a solid-pattern surface. Or, as shown in FIG. 20A, the conductor (for example, copper foil) of the dipole antenna 101 may be formed in a meander shape in both regions from the feeding portion 102 to the predetermined positions toward both ends of the dipole antenna 101, while both regions from the predetermined positions to both ends of the dipole antenna 101 are formed as a solid surface.

The conductor region formed into the meander shape has a pattern where a thin conductor having a width sufficiently narrower than the width of the conductor of the dipole antenna 101 in the width direction is bent into a crank shape a plurality of times. That is, the conductor region formed into the meander shape has the pattern where the conductor is formed as a so-called meander line. On the other hand, the solid pattern surface is a surface where the entire substrate 107 is covered with a conductor layer without gaps or a surface in which the entire substrate 107 is broadly and continuously covered with a conductor layer.

The conductor element 104 is a conductor pattern formed on the longitudinal member of the substrate 107. The conductor element 104 is formed such that its length (i.e., length of the conductor element 104 in the direction orthogonal to the dipole antenna 101) is ¼ wavelength of the resonance frequency of the dipole antenna 101.

Of both ends of the conductor element 104, one end closer to the feeding portion 102 is an open end insulated from the dipole antenna 101, while another end far from the feeding portion 102 is bent to be shorter than the one end at a right angle. Then, by electrically connecting the bent region and the outer conductor of the coaxial line 103 using, for example, soldering or the like, the outer conductor 110 of the coaxial line 103 and the conductor element 104 can be short-circuited.

The land 108 disposed near the center of the conductor element 104 is provided to fix the coaxial line 103 to the substrate 107. The coaxial line 103 can be fixed to the substrate 107 by adhering the land 108 to the outer conductor 110 of the coaxial line 103 using solder, for example.

FIG. 21 illustrates an appearance of the antenna 10 in which the coaxial line 103 is joined to the conductor element 104 and the dipole antenna 101 formed on the substrate 107. In the feeding point 102, the inner conductor and the outer conductor of the coaxial line 103 are respectively connected to the left antenna element and the right antenna element of the dipole antenna 101, so that a high-frequency signal is fed to the dipole antenna 101.

Further, the outer conductor 110 of the coaxial line 103 is short-circuited to the conductor element 104 at the end of the conductor element 104 far from the feeding point 102 so as to form a short-circuited portion 105. In addition, the land 108 shown in FIG. 20A and the outer conductor 110 of the coaxial line 103 may be adhered to each other by, for example, soldering to strengthen the connection between the coaxial line 103 and the substrate 107.

When the coaxial line 103 is a type having an insulating sheath on the outer surface of the outer conductor 110, the coaxial line 103 and the substrate 107 may be joined, after removing the insulating sheath at the short-circuited portion 105 and at the connection portion with the land 108.

According to the antenna 10 of the second embodiment described above, the dipole antenna 101 and the conductor element 104 are formed on the same substrate 107, and thus, manufacturing process can be facilitated and the manufacturing time can be shortened. As a result, manufacturing cost of the antenna 10 can be reduced.

Other Embodiments of Antenna with Conductor Element

Figure 22B:
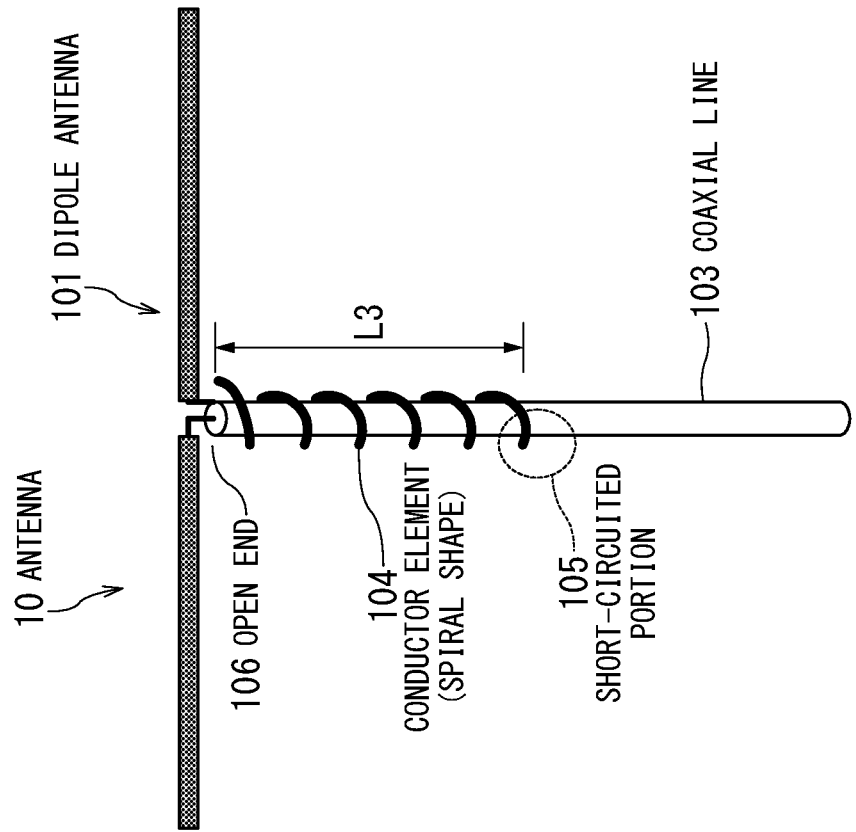
FIG. 22A and FIG. 22B are schematic diagrams illustrating other embodiments of the antenna.
Figure 22A:
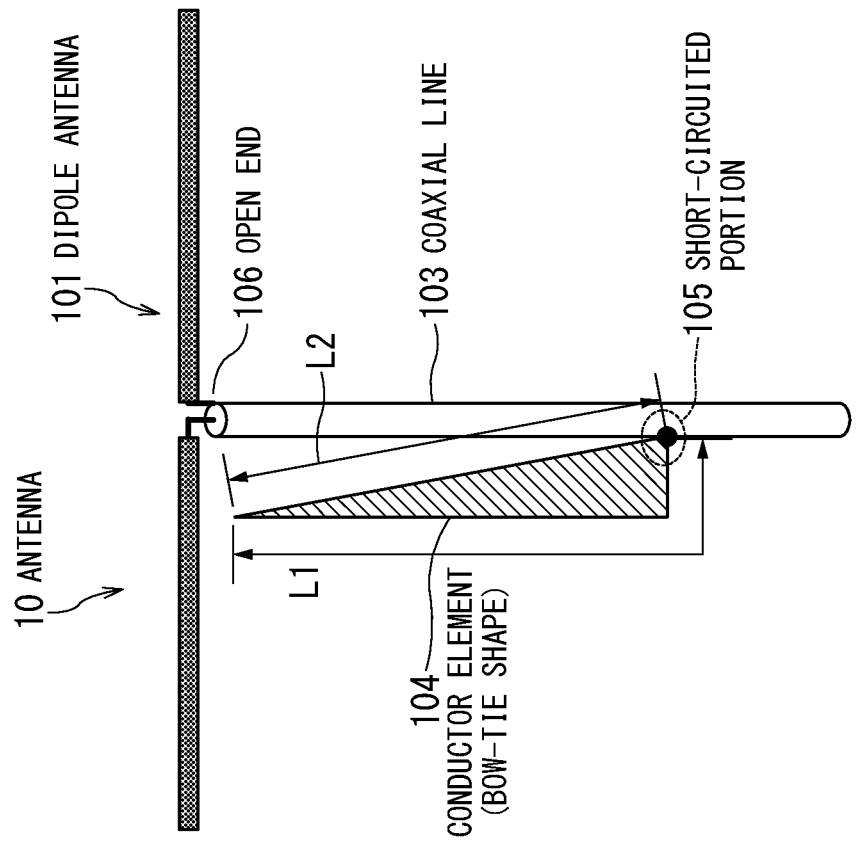

FIG. 22A and FIG. 22B are schematic diagrams illustrating other embodiments of the antenna with a conductor element. FIG. 22A illustrates an embodiment in which one half of a bowtie-shaped (i.e., a triangular-shaped) element is used as the conductor element 104. The bowtie-shaped conductor element 104 is formed in a vertically long triangular shape in which the short-circuited portion 105 constitutes the base and the open end 106 constitutes the apex. Although the length of the bowtie-shaped conductor element 104 is formed to be approximately ¼ wavelength, the effect of the conductor element 104 can be exerted over a wide band by forming the conductor element 104 in a planar shape.

For example, when the shape of the conductor element 104 is a right triangle, setting the length of the hypotenuse as L2 and the sum of the lengths of the opposite side and the base as L1 (L1>L2) enables the conductor element 104 to achieve a wide band characteristic determined by a lower limit frequency defined by the length L1 and an upper limit frequency defined by the length L2.

FIG. 22B is a schematic diagram illustrating another embodiment in which the conductor element 104 has a spiral shape. In this embodiment, the conductor element 104 is a line-shaped element that is spirally wound around the outer surface of the coaxial line 103. In this embodiment, at least one of the outer surface of the conductor element 104 and the outer surface of the line-shaped element is covered with an insulating film, and the portions excluding the short-circuited portion 105 are insulated from each other.

In this embodiment, the length L3 from the short-circuited portion 105 to the open end 106 of the conductor element 104 can be made shorter than the ¼ wavelength, and the antenna 10 can be miniaturized.

Figures 23A, 23B:
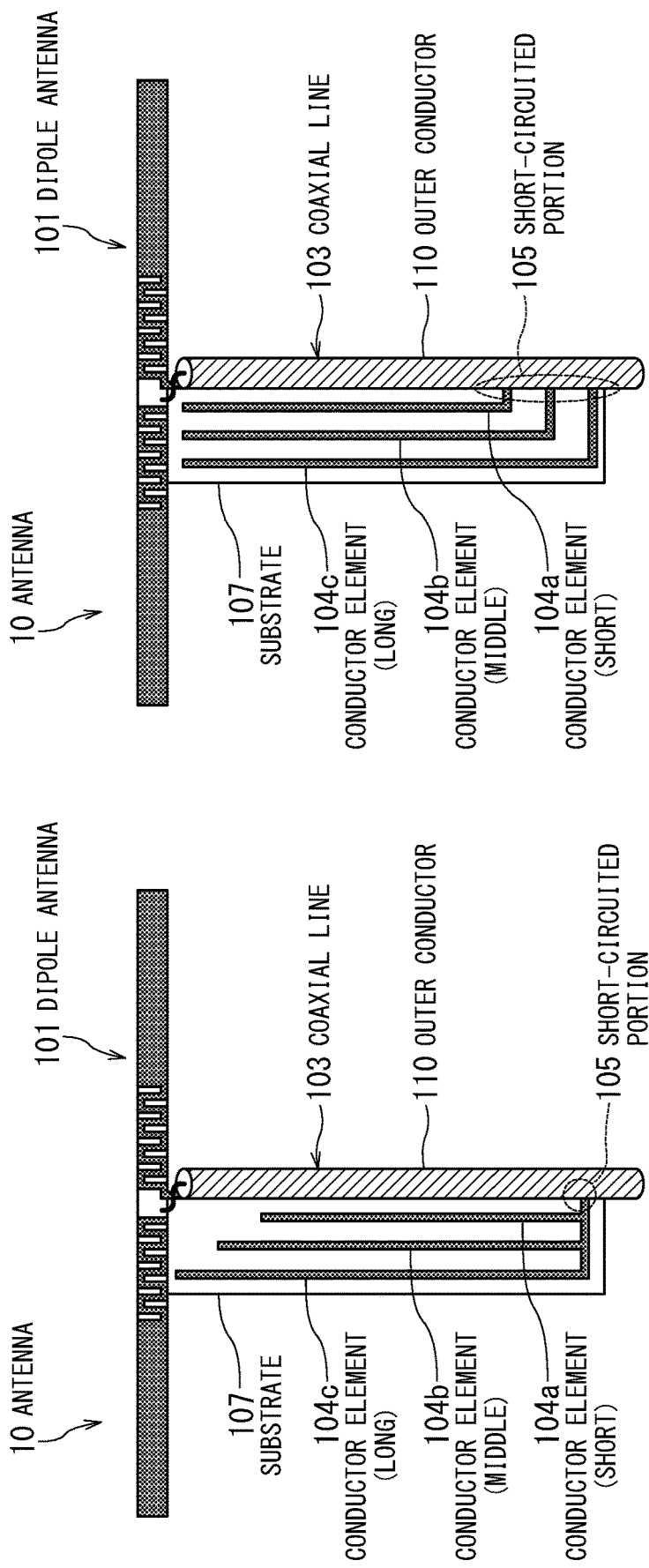
FIG. 23A is schematic diagram illustrating a configuration of an antenna having a plurality of L-shaped conductor elements that are different in length.
FIG. 23B is a schematic diagram illustrating a configuration of another antenna having a plurality of L-shaped conductor elements that are different in length.

FIG. 23A and FIG. 23B are schematic diagrams illustrating modifications of the conductor element 104 of the antenna 10 shown in FIG. 21. In these modifications, the conductor element 104 is composed of a plurality of conductor elements having different lengths, for example, three conductor elements 104a, 104b, 104c.

FIG. 23A illustrates the conductor element 104 having a configuration in which the three conductor elements (i.e., L-shaped elements) 104a to 104c are integrated at the base and are short-circuited at one point to the outer conductor 110 of the coaxial line 103. FIG. 23B illustrates the conductor element 104 having a configuration in which the three conductor elements (i.e., L-shaped elements) 104a to 104c are independently short-circuited at respective three points to the outer conductor 110 of the coaxial line 103.

When the conductor element 104 has a single length, it may not be the optimum length depending on the body shape of the object. Thus, in the embodiments illustrated in FIG. 23A and FIG. 23B, the three conductor elements (L-shaped elements) 104a, 104b, and 104c are made different in length to be short, medium, and long, respectively. The short conductor element 104a may be applied to the object of a slender body, the medium conductor element 104b may be applied to the object of a standard body, and the long conductor element 104c may be applied to the object of an obese body.

The antenna 10 of each embodiment shown in FIG. 23A and FIG. 23B can be readily realized because the conductor element 104 has a planar structure, and can be difficult to be achieved in the case of the conventional sleeve balun having a three-dimensional structure.

Figure 24:
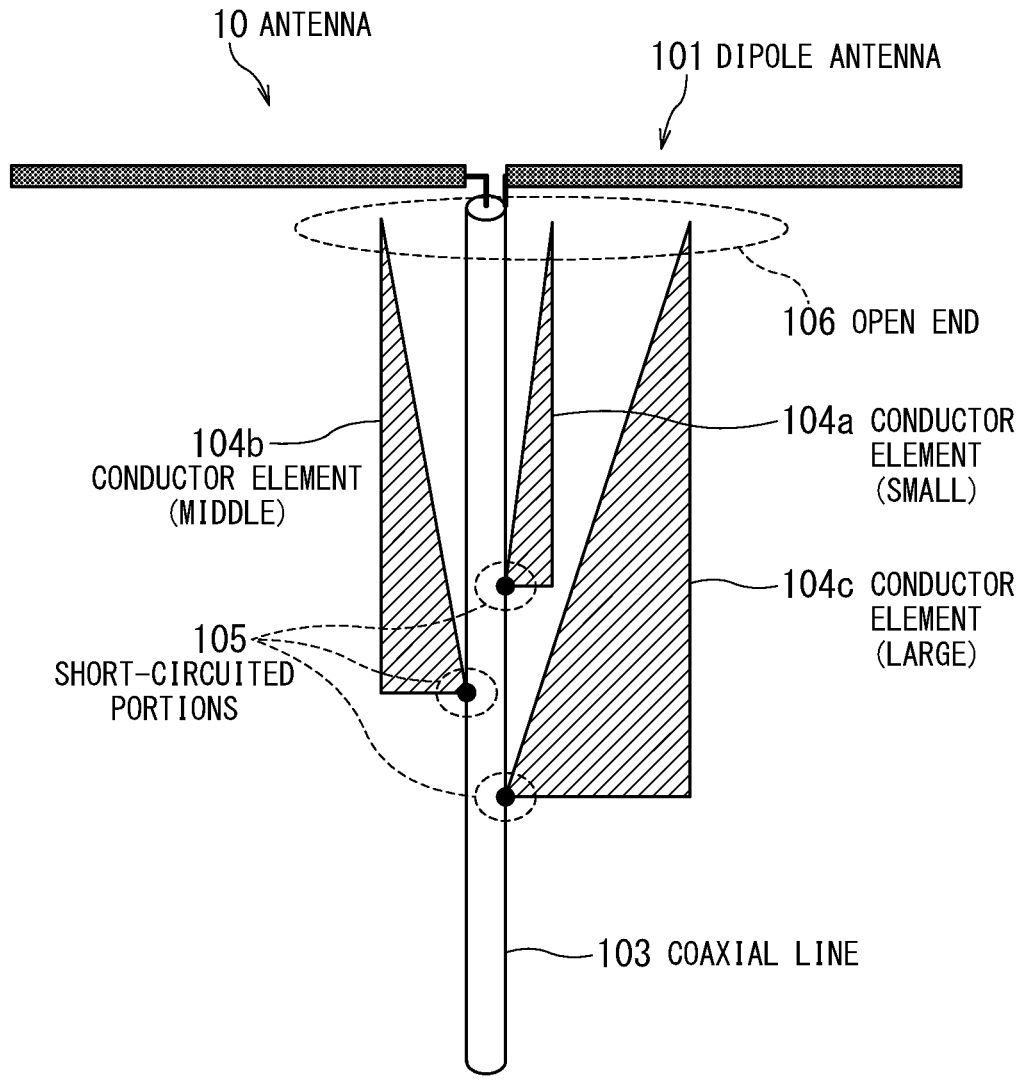
FIG. 24 is a schematic diagram illustrating a configuration of an antenna having a plurality of triangular-shaped conductor elements that are different in size.

FIG. 24 is a schematic diagram illustrating a modification of the antenna 10 having one half of bowtie-shaped (i.e., a triangular-shaped) conductor element 104 shown in FIG. 22A. In this modification, the conductor element 104 is composed of a plurality of conductor elements that are substantially similar in shape but different in size, for example, composed of the three conductor elements 104a, 104b, and 104c.

Although the bowtie-shaped conductor element 104 has wideband characteristics, when the bowtie-shaped conductor element 104 has a single size, it may not be the optimum size depending on the body shape of the object. In the embodiment illustrated in FIG. 24, the three bowtie-shaped conductor elements 104a, 104b, and 104c are made different in size to be small, medium, and large, respectively. The small conductor element 104a may be applied to the object of a slender body, the medium conductor element 104b may be applied to the object of a standard body, and the large conductor element 104c may be applied to the object of an obese body.

The antenna 10 of the embodiment shown in FIG. 24 can be readily realized because the conductor element 104 has a planar structure, and can be difficult to be achieved in the case of the conventional sleeve balun having a three-dimensional structure.

According to the biological information monitoring apparatus 1 of each embodiment as described above, biological information such as heartbeat and/or respiration of an object can be stably and reliably detected without imposing a burden on the object.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A biological information monitoring apparatus, comprising:
  an antenna assembly including a transmission antenna and a reception antenna, the antenna assembly being disposed close to an object;
  a signal generator configured to generate a radio-frequency (RF) signal;
  a displacement detection circuit configured to detect a physical displacement of the object based on the RF signal; and
  a diversity determination circuit configured to perform switching so as to detect either a reflected signal from the reception antenna or a transmitted signal transmitted from the transmission antenna to the reception antenna, the detected signal corresponding to the physical displacement of the object,
  wherein each of the antennas comprises:
    a dipole antenna having a feeding point to be supplied with the RF signal, the feeding point being positioned in a center of the dipole antenna;
    a coaxial line configured to supply the RF signal to the feeding point; and
    a conductor element that has a length of ¼ wavelength of a resonance frequency of the dipole antenna, is short-circuited on one end to an outer conductor of the coaxial line, and is formed in an L-shape with a planar structure of a line-shaped conductor or a band-shaped conductor.

2. The biological information monitoring apparatus according to claim 1, wherein the conductor element is open on one end closer to a feeding point of the dipole antenna and is short-circuited to the outer conductor on an opposite end farther from the feeding point.

3. The biological information monitoring apparatus according to claim 2, wherein a distance between the one end of the conductor element and the feeding point of the dipole antenna is set to be shorter than the ¼ wavelength.

4. The biological information monitoring apparatus according to claim 1, wherein:
  the conductor element is disposed to be substantially in parallel with the coaxial line; and
  a distance between the conductor element and the coaxial line is set to be shorter than ¹⁄₁₀ wavelength.

5. The biological information monitoring apparatus according to claim 1, wherein the dipole antenna and the conductor element are formed on a same substrate.

6. The biological information monitoring apparatus according to claim 5, wherein:
  a tip of the coaxial line is connected to the feeding point of the dipole antenna formed on the substrate; and
  an outer conductor of the coaxial line is short-circuited to a predetermined point of the conductor element formed on the substrate.

7. The biological information monitoring apparatus according to claim 6, wherein the predetermined point of the conductor element is an end of the conductor element farther from the feeding point of the dipole antenna.

8. The biological information monitoring apparatus according to claim 5, wherein:
  the dipole antenna is configured as a planar dipole antenna; and
  a conductor of the planar dipole antenna is formed in a meander shape in both regions from the feeding point to predetermined positions toward both ends of the planar dipole antenna, the feeding point being a point to be supplied with the RF signal, and is formed as a solid-pattern in both regions of the conductor from the predetermined positions to the both ends of the planar dipole antenna.

9. The biological information monitoring apparatus according to claim 1, wherein the conductor element includes a plurality of L-shaped conductor elements different from each other in length of a longer side of L-shape.

10. An MRI apparatus comprising the biological information monitoring apparatus according to claim 1.

11. A biological information monitoring apparatus, comprising:
  an antenna assembly including a transmission antenna and a reception antenna, the antenna assembly being disposed close to an object;

a signal generator configured to generate a radio-frequency (RF) signal;

a displacement detection circuit configured to detect a physical displacement of the object based on the RF signal; and a diversity determination circuit configured to perform switching so as to detect either a reflected signal from the reception antenna or a transmitted signal transmitted from the transmission antenna to the reception antenna, the detected signal corresponding to the physical displacement of the object, wherein each of the antennas comprises:

a dipole antenna having a feeding point to be supplied with the RF signal, the feeding point being positioned in a center of the dipole antenna;

a coaxial line configured to supply the RF signal to the feeding point; and a conductor element that has a length of ¼ wavelength of a resonance frequency of the dipole antenna, is short-circuited on one end to an outer conductor of the coaxial line, and is formed in a triangular shape with a planar structure.

12. The biological information monitoring apparatus according to claim 11, wherein the conductor element is open on one end closer to the feeding point of the dipole antenna and is short-circuited to the outer conductor on an opposite end farther from the feeding point.

13. The biological information monitoring apparatus according to claim 12, wherein a distance between the one end of the conductor element and the feeding point of the dipole antenna is set to be shorter than the ¼ wavelength.

14. The biological information monitoring apparatus according to claim 11, wherein the conductor element includes a plurality of triangular-shaped conductor elements different from each other in size.

15. A biological information monitoring apparatus, comprising:

an antenna assembly including a transmission antenna and a reception antenna, the antenna assembly being disposed close to an object;

a signal generator configured to generate a radio-frequency (RF) signal;

a displacement detection circuit configured to detect a physical displacement of the object based on the RF signal; and a diversity determination circuit configured to perform switching so as to detect either a reflected signal from the reception antenna or a transmitted signal transmitted from the transmission antenna to the reception antenna, the detected signal corresponding to the physical displacement of the object, wherein each of the antennas comprises:

a dipole antenna having a feeding point to be supplied with the RF signal, the feeding point being positioned in a center of the dipole antenna;

a coaxial line configured to supply the RF signal to the feeding point; and a conductor element that has a length of ¼ wavelength of a resonance frequency of the dipole antenna, is short-circuited on one end to an outer conductor of the coaxial line, and is formed in a spiral shape.

16. The biological information monitoring apparatus according to claim 15, wherein the conductor element is open on one end closer to the feeding point of the dipole antenna and is short-circuited to the outer conductor on an opposite end farther from the feeding point.

17. The biological information monitoring apparatus according to claim 16, wherein a distance between the one end of the conductor element and the feeding point of the dipole antenna is set to be shorter than the ¼ wavelength.

* * * * *